United States Patent
Selig, IV et al.

(10) Patent No.: US 9,652,312 B2
(45) Date of Patent: May 16, 2017

(54) REALTIME PROCESSING OF STREAMING DATA

(71) Applicant: FishEye Products, LLC, Maynard, MA (US)

(72) Inventors: Ernest Theodore Selig, IV, Carlisle, MA (US); Michael Harold Ackroyd, Acton, MA (US)

(73) Assignee: Fisheye Products, LLC, Maynard, MA (US)

(*) Notice: Subject to any disclaimer, the term of this patent is extended or adjusted under 35 U.S.C. 154(b) by 41 days.

(21) Appl. No.: 14/789,197

(22) Filed: Jul. 1, 2015

(65) Prior Publication Data
US 2016/0004578 A1    Jan. 7, 2016

Related U.S. Application Data

(60) Provisional application No. 62/020,778, filed on Jul. 3, 2014, provisional application No. 62/020,782, filed on Jul. 3, 2014.

(51) Int. Cl.
*G06F 3/00*     (2006.01)
*G06F 9/44*     (2006.01)
(Continued)

(52) U.S. Cl.
CPC .......... *G06F 9/546* (2013.01); *G06F 9/44505* (2013.01); *G06F 9/541* (2013.01)

(58) Field of Classification Search
None
See application file for complete search history.

(56) References Cited

U.S. PATENT DOCUMENTS

| 7,451,232 B1 | 11/2008 | Cole et al. |
| 7,660,805 B2 | 2/2010 | Chan et al. |

(Continued)

FOREIGN PATENT DOCUMENTS

| WO | WO 03/060751 | 7/2003 |
| WO | WO 2016/004188 A1 | 1/2016 |

OTHER PUBLICATIONS

International Search Report and Written Opinion dated Oct. 14, 2015 for PCT/US2015/038806 entitled "Realtime Processing of Streaming Data".

(Continued)

*Primary Examiner* — Tuan Dao
*Assistant Examiner* — William C Wood
(74) *Attorney, Agent, or Firm* — Hamilton, Brook, Smith & Reynolds, P.C.

(57) ABSTRACT

The invention described here is intended for enhancing the technology domain of real-time and high-performance distributed computing. This invention provides a connotative and intuitive grammar that allows users to define how data is to be automatically encoded/decoded for transport between computing systems. This capability eliminates the need for hand-crafting custom solutions for every combination of platform and transport medium. This is a software framework that can serve as a basis for real-time capture, distribution, and analysis of large volumes and variety of data moving at rapid or real-time velocity. It can be configured as-is or can be extended as a framework to filter-and-extract data from a system for distribution to other systems (including other instances of the framework). Users control all features for capture, filtering, distribution, analysis, and visualization by configuration files (as opposed to software programming) that are read at program startup. It enables large scalable computation of high velocity data over distributed heterogeneous platforms. As compared with conventional approaches to data capture which extract data in (Continued)

proprietary formats and rely upon post-run standalone analysis programs in non-real-time, this invention also allows data streaming in real-time to an open range of analysis and visualization tools. Data treatment options are specified via end-user configuration files as opposed to hard-coding software revisions.

22 Claims, 22 Drawing Sheets

(51) Int. Cl.
  *G06F 9/46* (2006.01)
  *G06F 13/00* (2006.01)
  *G06F 9/54* (2006.01)
  *G06F 9/445* (2006.01)

(56) References Cited

U.S. PATENT DOCUMENTS

| | | |
|---|---|---|
| 7,788,227 B1 | 8/2010 | Nettleton et al. |
| 8,510,270 B2 | 8/2013 | Pareek et al. |
| 8,666,960 B2 | 3/2014 | McCormack et al. |
| 2011/0161321 A1 | 6/2011 | de Castro Alves et al. |
| 2012/0185464 A1 | 7/2012 | Kuroda et al. |
| 2012/0296862 A1 | 11/2012 | Duda et al. |
| 2013/0275363 A1 | 10/2013 | Wu et al. |
| 2014/0156724 A1* | 6/2014 | Said ................. H04L 67/10 709/203 |

OTHER PUBLICATIONS

Wikipedia, "Floating Point"; http://en.wikipedia.org/wiki/Floating_point_arithmetic retrieved from Internet Mar. 12, 2015.
Wikipedia, "Minifloat"; http://en.wikipedia.org/wiki.Minifloat retrieved from Internet Mar. 12, 2015.
Wikipedia; Endianness; http://en.wikipedia.org/wiki/Endianness retrieved from Internet Mar. 12, 2015.
Wikipedia; "Bitmap"; http://en.wikipedia.org/wiki/Bitmap retrieved from Internet Mar. 12, 2015.
Notification Concerning Transmittal of International Preliminary Report on Patentability for PCT/US2015/038806, "Realtime Processing of Streaming Data", Date of Mailing: Jan. 12, 2017.

* cited by examiner

REALTIME PROCESSING OF STREAMING DATA

RELATED APPLICATIONS

This application claims the benefit of U.S. Provisional Application No. 62/020,778, filed on Jul. 3, 2014 and of U.S. Provisional Application No. 62/020,782, filed on Jul. 3, 2014.

The entire teachings of the above applications are incorporated herein by reference.

GOVERNMENT SUPPORT

This invention was made with government support under SBIR FA8650-13-C-1601 from the Air Force Research Labs MULTISPECTRAL SENSING & DETECTION DIVISION (AFRL/RYMD) and under SBIR N00024-11-NR-52325 from the Navy, Naval Sea Systems (NAVSEA). The government has certain rights in the invention.

BACKGROUND OF THE INVENTION

Computing systems often must be able to move data between heterogeneous platforms (e.g., differing CPU architectures, differing processor or machine languages) over various transport media (e.g., shared memory, disk drive, Internet Protocol (IP) networks). The typical approach to covert data to a machine-portable format or to devise custom software to convert the data to the target-platform format. Converting data into a machine-portable format (e.g., ASCII text or XML) or target-platform format ensures it can be read by the destination computing platform but entails using resources to convert the native platform-specific layout into the portable form and can result in less efficient format s that require additional transport resources.

SUMMARY OF THE INVENTION

Data must be encoded or decoded when flowing between differing computing architecture (hardware, computing platforms, languages, operating systems, and storage devices) that model binary data differently. In high-performance systems, conventional data capture techniques rely on capturing data in the host computing-architecture specific formats. The run-time desired to maximize data capture performance comes with a downstream cost of post process conversion that is costly and complex. In an embodiment, the present invention defines a process that performs some upfront collection of host computing data models that keep the highest possible data collection efficiency while simplifying and streamlining the downstream conversion process.

Concepts, components, and terms need to be defined related to embodiments of the present invention. The following terms are used to describe embodiments of the present invention. The definitions are expressed from the perspective of how embodiments of the present invention works in its arenas of applicability. Some of these terms are used both in text and in diagrams. FIG. 1 provides a legend illustrating some of the terms.

An Operation is processing that is performed to bring a specified result, for example, arithmetic calculation, logical comparison, data input, data output, flow control, or resource management.

A Computer is a general purpose device that can be programmed to carry out a sequence of Operations automatically.

A User 106 is a person that uses a Computer to program Operations or to use a Computer for processing a set of programmed Operations.

Data 101 is a set of values that is stored in or transmitted via an electronic or electromagnetic medium. Data representations can include characteristics such as:
a) Data formats like integer, float, enumerations (numbers that represent different meanings like 1=True and 0=False or ASCII character representations)
b) Size and structure of data like 8-bit or 16-bit characters, 16, 32, 64-bit integers, 32 or 64-bit floats in formats like IEEE 754 or MiniFloats, Fixed Point, Binary Coded Decimal
c) Data identifiers so that instructions can access and manipulate the values in memory
d) Data semantics like arrays of Data or memory pointers to Data
e) Endianness convention for the byte order used to encode binary data
f) Bit Packing or Bit Maps A Data Schema 108 specifies how the physical storage of Data on a Platform maps into its computational form in a Process. Data Schema are not typically emitted in conventional compilation procedures, rather they are elements that are created and used by embodiments of the present invention being described herein.

A Semantic Relationship 112 is an association between the meanings of two or more Data Schema, separate and distinct from structural or terminological representations. Semantic Relationships allow the synthesis of information associated with patterns of data meanings.

A Domain is a distinct, independent subject matter area within the concept space of an application. A Domain identifies application concepts (terminology and functionality) and the Semantic Relationships between the concepts. For complex systems can have multiple Domains where Domains depend upon other Domains (in a hierarchy). For example, an online book ordering application has a top level Domain "Online Bookstore" which depends upon lower level Domains: "Inventory", "Web Presentation", "Credit Card Processing", and "Shipping". Both the "Online Bookstore" and the "Inventory" Domains depend up the "Web Presentation" Domain. In embodiments of the present invention, a concept in a Domain is representable by a Data Schema.

A Domain-Specific Language (DSL) is a grammar expressed in terms of the concepts and Semantic Relationships of an application Domain. A DSL can typically be converted into an executable Process.

An Ontology 109 is a formal representation of knowledge as a hierarchy of concepts within a Domain, using a shared vocabulary to denote the types, properties and interrelationships of those concepts. In the context of this invention, an Ontology is a specification of the Semantic Relationships among a set of Data Schema.

A Disk 102 is a device on which data can be recorded and saved.

A Processor 105 is a computer integrated circuit (e.g., CPU, FPGA, ASIC, GPU, DNA computers or specific Integrated Circuits) or a combination of integrated circuits made by a particular vendor capable of executing a sequence of instructions. The Processor loads machine instructions that are specific to the hardware and a platform-specific representation of Data.

Native Format Data is Data consisting only of its in-memory representation in a Processor for a particular Platform.

An Operating System is software that manages Processor resources and provides common services for computer programs.

An Application or Process 104 is a sequence of instructions that perform specified tasks with a Computer. A Process can receive Data as input, store Data in memory, perform Operations, and send Data as output.

Source Code 103 is a sequence of human-readable statements that specify Operations to be executed in a Process. Source Code is expressed in a programming language and compiled into an executable Process for a specified Processor.

The Platform 113 represents a subset of the components of a Computer comprising any number of the following: Processor, Processor Operating System, and Disk.

In a running system, Data and instructions can flow both within a Process and between Processes. This flow is referred to as Operational Flow 111. The special case where Data flows from a source to multiple targets concurrently is a Concurrent Flow 110. Details of Data flow include Multiplexing 107A and DeMultiplexing 107B. Multiplexing splits a flow from a single source to multiple targets. Demultiplexing joins flows from multiple sources into a single target.

FIG. 2 is a diagram illustrating an example embodiment of Conventional Application Compilation and Execution. A User 201 develops an Application 202 by writing Source Code 203 and compiling the Source Code into a Process. The Source Code 203 contains logical declarations of data types and instantiates those data types to create Data 204 values within a Process. The way the values are stored in the Processor Hardware memory depends on both the Processor (as indicated above) and on how the compiler is used to create the Process (e.g., alignment, padding).

The following method illustrated by in FIG. 2, enable a user defined application to function in a specific platform:

A User 201 creates human readable program instructions in Source Code 203 defining in the source code 203 an Application 202. The User 201 defines application specific instructions that include User-defined Data Schema and Ontology.

A Compiler 205 converts the Source Code 203 into an Application 202.

The Compiler 205 uses information about the Hardware 206 and Operating System 207 to build the Application 202 executable in machine instructions.

A Platform specific Application 202 creates Data 204 that is in machine (e.g., binary) format specific to the combination of the Application, Hardware, Operating System, Data Schema, and Ontology.

In software systems, selected data items can provide critical data indicators of what applications are producing and how well they are performing their tasks. At pivotal points in the execution, such data items are captured for subsequent analysis, conventionally referred to as "data reduction". Historically, data capture and analysis was addressed on an individual program basis and was typically handled in one of two ways. FIGS. 3-4 illustrate two respective typical legacy approaches: offline analysis and data streaming.

FIG. 3 illustrates the offline analysis legacy approach. In the earlier days of computing (pre-1990s), computer hardware and storage devices were not powerful enough to handle the processing and memory needed for data analysis in addition to the application processing. Captured data was stored in the native format of the application program and analysis was deferred as an offline activity. The typical approach dedicated program budget and resources to developing custom converters 301 for each individual program. Such custom converters were tied directly to the specific data types of the legacy system to extract the data from the program and to store it in proprietary, non-transferable data products (e.g., binary files 302) used by offline data reduction tools. The offline data reduction tools must also use custom converters 303 to read the proprietary data products into the memory of the offline platform.

FIG. 4 illustrates the data streaming legacy approach. More recently, computing resources became affordable commodity items, enabling same-time analysis to become a viable option. However, due to the absence of enterprise data processing solutions (e.g., custom formats, platform-specific data capture tools), the conventional approach has remained the same point-specific tools for data capture along with custom converters 401. Even with the emergence of open data exchange standards such as eXtensible Markup Language (XML), standard media converters 402 nevertheless add processing and transport size overhead that impede the performance of real-time systems.

Data capture technology tied to a specific program runs the risk of becoming brittle, non-scalable, non-maintainable, or obsolete. Further, proprietary, non-standard data formats increase the cost of data analysis tools and hinder the ability to add future capabilities that make use of that data.

Additional shortcomings of the conventional approach are: (1) as application software changes over time, its data types also evolve (e.g., revising existing data type declarations, adding/removing data types); (2) Users may make changes in data capture choices based on experiences with other applications (e.g., removing capture choices, adding new capture points); (3) as increasing numbers of applications exchange more types of data are exchanged among, the relative meanings of the exchanged data become difficult to discern (e.g., differing structure and terminology introduce semantic gaps) undermining interoperability in Systems of Systems; and (4) in contemporary computing grids, large volumes of a variety of data types are being distributed at high velocity (Big Fast Data), but the conventional point solution approach is not sufficient to support data exchange needs in a timely manner nor can it scale to expansive networks (e.g., M×N point-to-point custom converters cannot be readily built nor can they efficiently handle exchange of large volumes of data among large numbers of exchange partners).

FIGS. 5-6 are diagrams illustrating two respective traditional approaches used to exchange data between computing platforms.

FIG. 5 is a diagram illustrating one state-of-the-art approach where Data Schemas are kept consistent by coordinating the schemas on each of the two platforms (e.g., Platform A 502 and Platform B 505). Application A 501, running on Platform A 502, creates Data D 503 with a user defined Schema 508. Data D 503 is converted by Conversion Process C 504 so the machine format can be shared between Platform A 501 and Platform B 505 (i.e., binary endianness, size and formats like float, char, or int). After the Conversion Process C 504, Application B 506 now understands the Data E 507 with user defined Schema 508. This approach requires coordination to ensure the applications maintain common Data Schema representation. One consequence of the manual coordination is that it is difficult or impossible to change a Data Schema at run time. Another consequence is that the approach requires computer resources on the source and target platform every time data is sent between platforms.

FIG. 6 is a diagram illustrating a second state-of-the-art approach where both Data and Data Schema are ported between platforms. Application A 602, running on Platform A 601, creates Data D 603 with a user defined Schema D 604. A common communication protocol (e.g., use XML, DDS, ASCII, RPC, Java RMI, CORBA or change to binary to match target machine) converts Schema D 604 and Data D 603 into Schema E 605 and Data E 606, respectively. Application B 607 can understand Schema E 605 and Data E 606. This leads to the issue of having to convert both the schema and the data for them to be shared over a network between two different platforms. This approach also requires run-time processing resources to convert both Data and Data Schema.

In summary, conventional data capture and data distribution tools and techniques have several problems. First, proprietary formats are closed, and platform specific data exchange requires run-time conversion or custom converter tools. Second, custom converters are platform-specific and re-inventing them for every program and platform is costly. They require time and computing resources to run. They typically must be run on the source platform, which is application specific and thus rare and expensive. Third, custom converters are brittle and non-maintainable because they are costly to revise and re-deploy for changes in data types. Fourth, point-to-point custom converters do not scale to handle the requirements of large data sets. Differing structure and terminology of conventional data exchange undermine information sharing in distributed systems.

In an embodiment of the present invention, Ontology-Based Concurrent Information Synthesis (OCIS) has a number of novel features that provide best-in-class solutions to important challenges in real-time data capture and interoperation of distributed, concurrent systems. These features include fundamental capabilities for data management and rich semantic mapping capabilities for information synthesis and knowledge mining.

The framework for data capture and distribution of OCIS uses minimum source code to achieve configurable data capture, distribution, and treatment. The framework further provides the fastest possible real-time data capture and distribution due to retaining native format of data. The framework selectively interprets data fields on an as-needed basis into target platform language. The framework distributes data across heterogeneous node clusters enabling scalable concurrent processing in Systems-of-Systems (SoS). The framework further provides a data injection callback programming interface, allowing Applications to participate in the framework treatment regime. The framework further provides a real-time stream-based visualizations enabling closed loop monitoring and control of distributed systems. The framework further provides high fidelity playback of archived data, which provides a ready-made real-time scenario machine.

Metadata Management Tools provide introspection of multiple computer programming languages, which facilitates data exchange between heterogeneous systems. The Metadata Management Tools also provide a domain-specific language specification of memory layout structure using a format that is intuitive to domain experts. The Metadata Management Tools provide automated data encoding and decoding between native format and user-defined representation medium. The Metadata Management Tools further provide a common standard data structure definition across platforms. The Metadata Management Tools provide a terminology that can be tailored with user-defined vocabulary and extended to include user-defined fields.

Complex Event Processing CEP provides user-defined rules to allow ad-hoc analysis of real-time event streams without requiring knowledge of data application schema and ontology across heterogeneous platforms. The CEP rules can filter event streams and synthesize richer semantic information from fundamental events. Further, ontology-based semantic mapping improves data exchanges between heterogeneous systems.

Ontology-Based Concurrent Information Synthesis (OCIS) provides a configurable and extensible software framework to minimize creation and maintenance of source code for Applications. Ontology composition tools enable knowledge representation, semantic mapping, and knowledge mining in concurrent, distributed systems.

One non-limiting embodiment of the present invention is a computer-implemented method for transferring data between a source platform and one or more target platforms. The method includes extracting application data schema and platform information that characterize data layout and computational interpretation of the native binary data on the source platform. The platform information includes encoding policy settings. The method also includes communicatively coupling the source platform and target platform(s), such that each target platform has access to the extracted application data schema and platform information. The method also includes, on each target platform, based on the extracted application data schema and platform information, synthesizing meaning from one or more selected fields within the native binary data from the source platform, resulting in synthesized information for the target platform operations.

Application data schema characterizes the data layout and computational interpretation of representation by application. This is also known as metadata. Platform information characterizes the data platform encoding policy settings on a specific platform. This is data about the platform. Native binary data is the instance of the encoded data on the platform influenced by the application data schema and platform information. This is also known as a binary representation of data.

FIG. 7 is a flow diagram illustrating that: (1) summarizes the conventional approach to data capture of FIGS. 3-4 (in the lower portion of the diagram) and the fundamental components of an embodiment of the present invention along with the data flows and control flows between those components (in the upper portion of the diagram). FIG. 7 illustrates how the information synthesis capabilities of this invention are distinguishably different from the conventional approach to data capture.

The problems of conventional data capture and data distribution tools and techniques can be remedied with the systems and methods of embodiments of the present invention, including the following improvements.

Problem #1 Summary: Proprietary formats are closed and platform specific data exchange requires run-time conversion or custom converter tools. Solution: Tools for migrating legacy data in native format to open standard formats (see, e.g., Hierarchal Data Format 5 (HDF5) Archiver).

Problem #2 Summary: Custom converters are platform-specific. They are costly to re-invent for every program-and-platform. They require time and computing resources to run. They typically must be run on the source platform which is application specific and thus rare and expensive. Solution: Programs can use platform and program independent data exchange techniques and tools (see DSL for Data Schema Definition). A program captures data in its native format tied to platform-specific Data Schema to optimize system efficiency by delaying data conversion processing, and therefore costs, to only when necessary.

Problem #3 Summary: Custom converters are brittle and non-maintainable. They are costly to revise and re-deploy for changes in data types. Solution: Data type changes no longer require source code revisions (see, e.g., DSL for Data Schema Definition).

Problem #4 Summary: Point-to-point custom converters do not scale to handle the requirements of large data sets. Solution: Data distribution is agnostic to payload data types, and data conversion is performed on an as-needed basis (see, e.g., Native Format streaming, Metalog-based data field access). Data filtering techniques and tools help manage the volume of data based on data patterns and rules, predicated on the current system load level (see, e.g., Data Filters and CEP). Fast processing of large volumes of data can be scaled by concurrent processing across large numbers of processors (see, e.g., Concurrent Distribution).

Problem #5 Summary: Differing structure and terminology of conventional data exchange undermine information sharing in distributed systems. Solution: Exchanges between systems can account for the meaning of the data and the data patterns in addition to syntax (see, e.g., Semantic Relationships). Semantic relationships among metadata offer an ontology-based technique for information synthesis (see, e.g., Ontolog).

One embodiment of the present invention utilizes a developed Domain Specific Language (DSL) for schema definition that has generalized the requirements for data transport and an invented tool that obviates the reliance on custom software for every data type and every transport medium. This tool provides a simple textual language for specifying mappings between the platform-specific layouts of data types and the transformed layouts in the selected transport medium. A network messaging infrastructure allows applications to configure various transport topologies for delivering data across platforms. By providing a connotative and intuitive grammar that allows users to define how data is to be automatically encoded/decoded for transport between computing systems, this capability eliminates the need for hand-crafting custom solutions for every combination of platform and transport medium. The approach maximizes run-time performance of heterogeneous systems by eliminating or reducing data conversion.

One embodiment of the present invention is a multi-language introspection tool that automatically analyzes the data types in a process (either source level or execution level) to produce a metadata representation for selected data stores, resulting in a technique for automatically synthesizing self-describing data. This metadata technique determines the memory layouts of data, produces metadata representations, and maintains that metadata in sharable and distributable forms. This enables data capture to extract native in-memory data directly without any conversion overhead. This data and its associated metadata can then be distributed to any other subscribing process using open standard delivery services. The metadata management tools installed in that process can compose the native data into the correct data type of the subscribing process. The net effect is the fasted possible data capture (e.g., by an in-memory binary copy) and data marshaling is automated for subscribing applications by the metadata management tools.

Embodiments of the present invention can include an instrumentation toolset that can be used to instrument a process (either injected at the source level or tapped into a running program) to extract data in its native format and to publish that data and its associated metadata to arbitrary destinations. At any given destination, the subscriber uses composition toolsets of the invention that use the metadata to transform the data from its native format to the format of the subscriber. Further, while HDF5 requires handcrafting a software solution for a particular language, the embodiments can be configured to create HDF5 dataset samples.

Another embodiment of the present invention is DSL for CEP. CEP allows arbitrary logic to be layered onto the system to discover hitherto unrecognized system performance patterns and to augment the quality of the information emerging from the system (or system of systems).

Another embodiment of the present invention is a novel data streaming framework. This is a framework that can serve as a basis for real-time capture, distribution, and analysis of big data. The framework can be configured as-is or can be extended as a framework to filter and extract data from a system for distribution to other systems, including other instances of the framework. Users control all features for capture, filtering, distribution, analysis, and visualization by configuration files (as opposed to software programming) that are read at program startup. As compared with conventional approaches to data capture which extract data in proprietary formats and rely upon post-run standalone analysis programs in non-real-time, this invention also allows data streaming in real-time to an open range of analysis and visualization tools. Data treatment options are specified via end-user configuration files as opposed to hard-coding software revisions.

Further, this user configurable framework allows non-invasive capture, analysis, and distribution of large volumes of a wide variety of data at high speed (e.g., big data or fast data) with little or no programming. Legacy data from multiple systems can be transformed into modern, standard, open, and self-describing formats and arbitrarily fused into hitherto unrealized higher-level forms of information. Data streaming enables immediate analysis and visualization and allows real-time control of system testing, as opposed to conventional post-run data reduction sessions that could entail days of latency. The journaling of expensive system operational scenarios enables iterative playbacks for improving stakeholders' understanding of the system and evolution of improvements to the system configuration and controls (e.g., adding new CEP rules, new filter criteria, new distribution topologies).

Another embodiment of the present invention leverages the recent advances in the general purpose graphical processing units (GPGPU) market that enable heterogeneous computing (e.g., computing using a blend of CPU and GPU processors). An embodiment of the present invention generalizes the instruction sets for both CPU and GPU operating systems and programming languages to create a treatment chain framework where programmers can devise flexible computation units, called Treatments. End users can compose these Treatments in a plug-and-play fashion to establish Treatment Chain(s). The heterogeneous computing (CPU/GPU) treatment chain framework enables vendor-independent GPU programming of processing chain of analysis. The framework also enables distributing streaming data to multiple computing devices for analysis and then interweaving the results back into a common data stream. These real-time and massively parallel processing capabilities replace hitherto CPU-only processing to provide increases in performance, which in certain embodiments are 1000× or greater.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
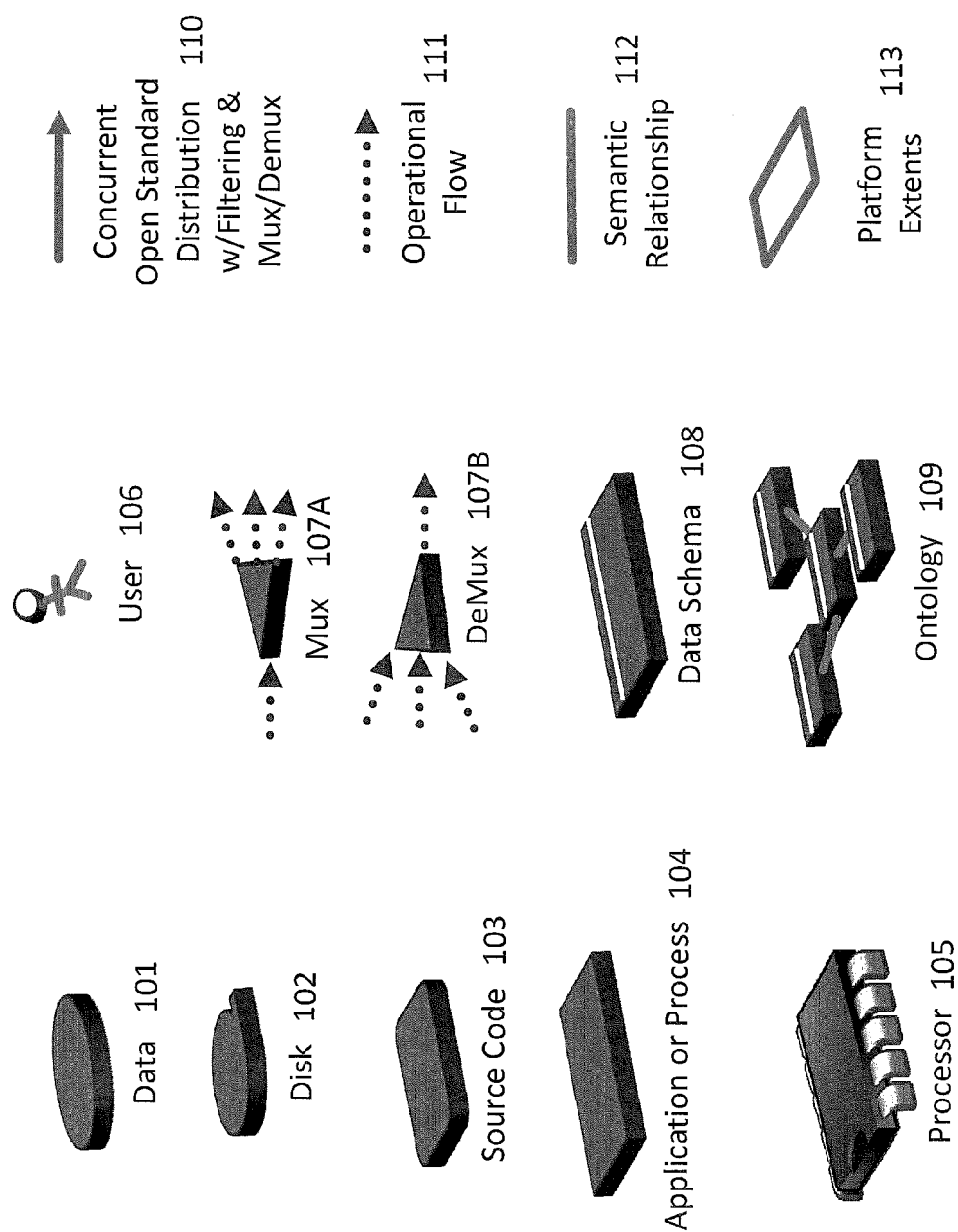
FIG. 1 is a diagram illustrating graphical notation that is used to describe the various aspects of data capture, distribution, and analysis.

Embodiments of the present invention include Ontology-Based Concurrent Information Synthesis (OCIS).

As systems and/or software develop, types of data and sites for capturing data evolve. Data requirements can change because, for example, in iterative development approaches, test results may indicate a need to capture new data at new program locations to support verification procedures. In addition, data requirements can change because, in integration, validation testing is needed; in deployment, analysis needs differ for differing mission conditions; in maintenance, troubleshooting collects data to ascertain root causes of failure; and in a fielded system, there arises the need to support system-of-systems queries. Therefore, in embodiments of the present invention, source code should be designed with a conservatively large number of capture point options in anticipation of all realistic situations.

Developing, maintaining, and revising software are time-consuming and expensive engineering processes. Moreover, field-deployed systems can be dispersed geographically over wide areas and can further be largely unavailable for revision (e.g., 24/7 systems, classified systems) so that the logistics for revision are prohibitive. Therefore, in embodiments of the present invention, data capture should be field-configurable to avert the need for source code revisions.

Modern computing systems (e.g., enterprise networks, sensor networks, mobile phone networks, internet) can be distributed, concurrent, and heterogeneous in nature. Distributed systems can (1) achieve scalability by partitioning processing loads across clusters of workstations; (2) provide services to large numbers of clients across wide geographic extents; and (3) provide redundancy in case of hardware or networking failures. Therefore, in embodiments of the present invention heterogeneous types of data are captured from networks of distributed systems and information synthesis should be able to be performed on any selected processors available in the network.

The data in each process in a system needs to be shared with other programs in a system. Two techniques for sharing data across processes are data integration and data exchange. Data integration provides a uniform interface for querying a collection of data sources. Data integration systems require semantic integration that maps local schema to global schema prior to deployment of services. Data exchange uses schema-mapping specifications to take data structured under a source Data Schema and to transform it into Data structured under a target Data Schema. Shareable Data can be heterogeneous, that is, it can have differing structure and terminology because the processes in a system can be implemented in differing languages on differing operating systems on differing computer hardware. In both cases of data integration and data exchange, converting Data requires processing time and usually results in increased memory demands. These costs are true across all venues within a distributed system: within application memory, at inter-process connection points, and through connecting network channels. Data conversion should be done only as-needed to minimize runtime overhead. Moreover, when data conversion is needed, data conversion should leverage knowledge of the semantics of the concepts associated with the data to synthesize heterogeneous representations into homogeneous domain-specific vocabularies.

OCIS uses native format data in all data flows to minimize the overhead associated with custom converters and media converters. Typically, the only time that data fields need to be converted is when they are being evaluated in an expression. The result of this decision is that data capture and data distribution require only the copying of memory, which is an faster than any custom converter or media converter. OCIS provides facilities for converting any selected data field from its native data format into a computational form that is suitable for use in program expressions. The information for this conversion is metadata, or data about the Data, which is a specification for how Data is defined. A common software naming convention for a specification of how entities are defined is a "schema". Therefore, in OCIS, this metadata is referred to as a "Data Schema".

Figure 7:
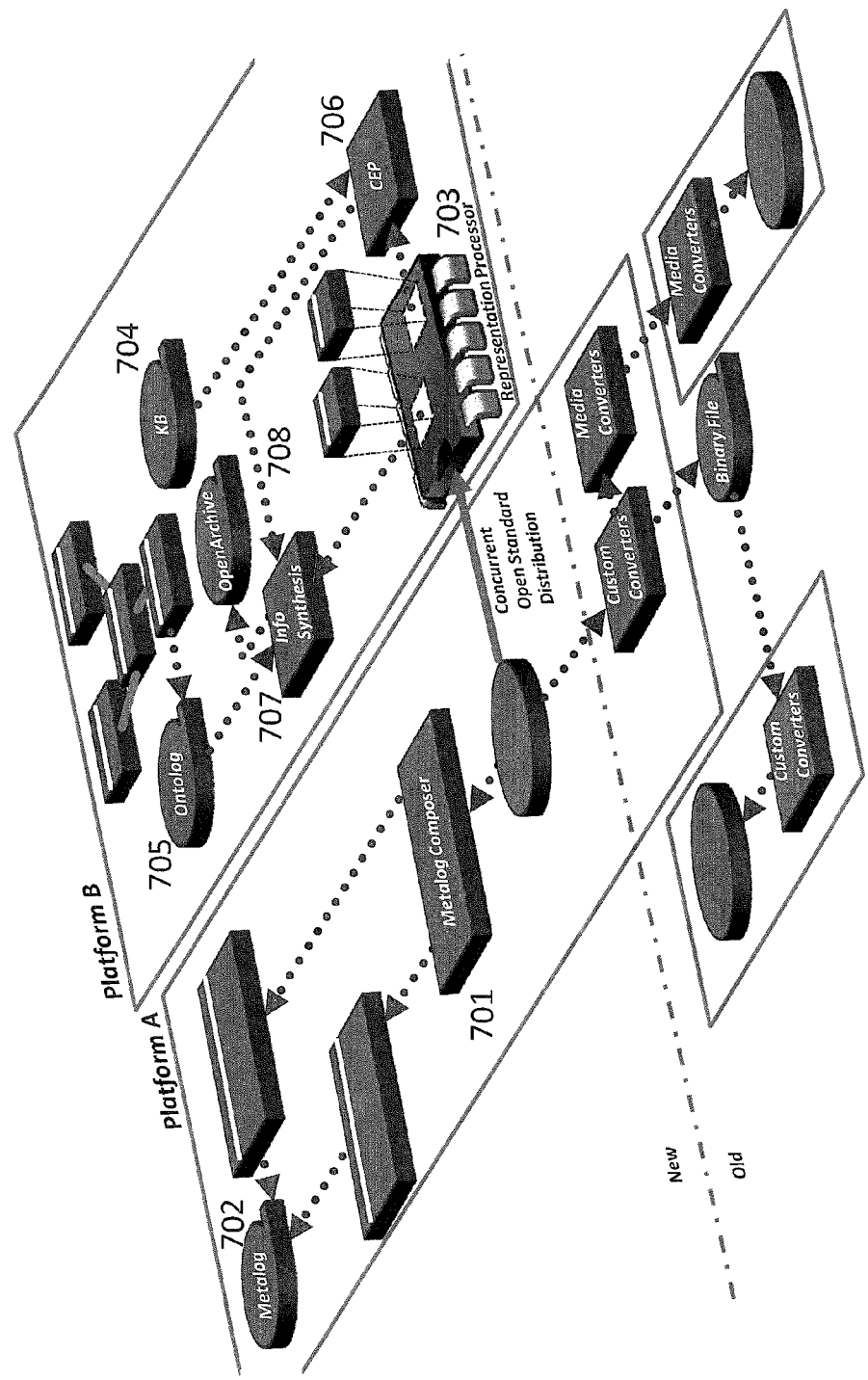
FIG. 7 is a block diagram illustrating an ontology-based concurrent information synthesis system according to one embodiment of the present invention.
Figure 8:
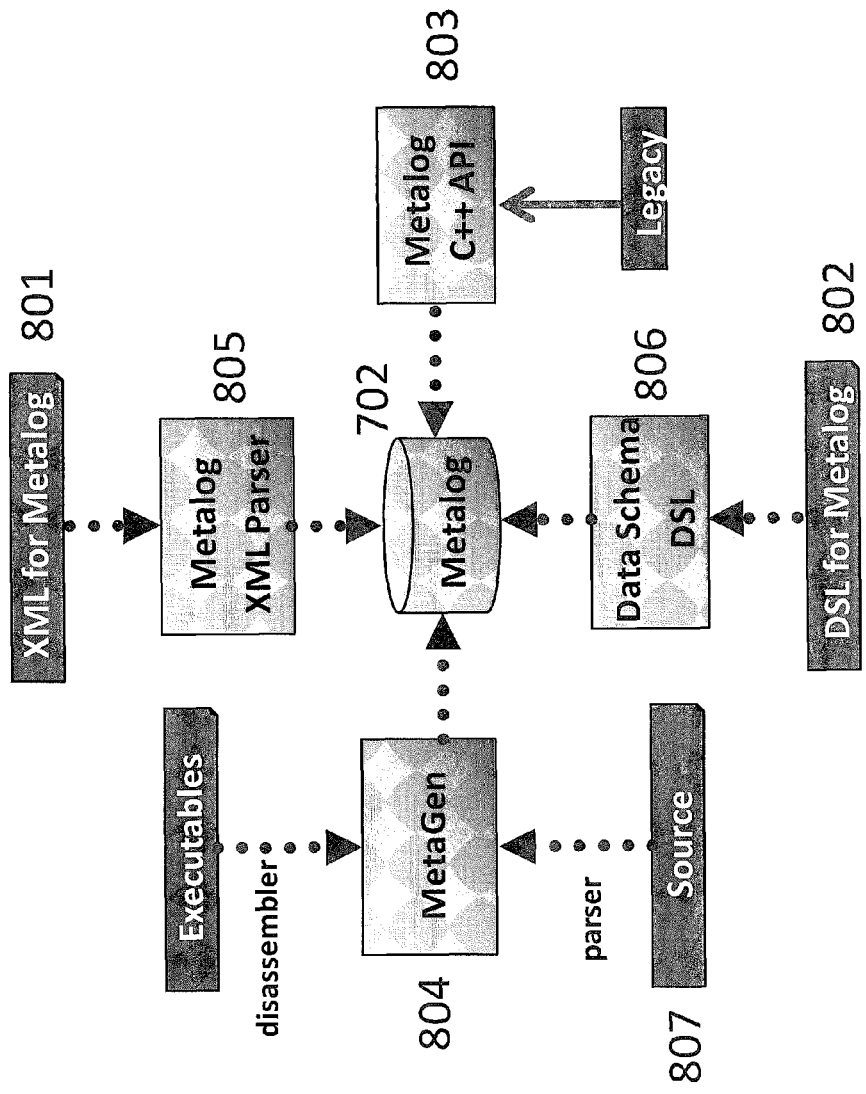
FIG. 8 is a diagram illustrating collecting a Metalog from at least one of five sources.

For a given set of applications, a Data Schema is defined for each type of data created within an OCIS embodiment. The Data Schemas are stored in a catalog. Each Data Schema is assigned a unique integer identifier for metadata management purposes. This catalog of metadata is referred to as a "Metalog," which contains a set of Data Schema for use by OCIS. A Metalog 702 can be created in various ways as shown in FIG. 8, for example, by using at least one of eXtensible Markup Language (XML) 801, Domain Specific Languages (e.g., DSL for Data Schema Definition) 802, Application Programming Interfaces (APIs) 803, and/or Metalog Generation Programs (MetaGen) 804. The Metalog Composer 701, of FIG. 7, can create a Metalog 702 for OCIS. The Metalog composer 701 converts data into a Data Schema and then adds the Data Schema to the Metalog 702.

Figure 10:
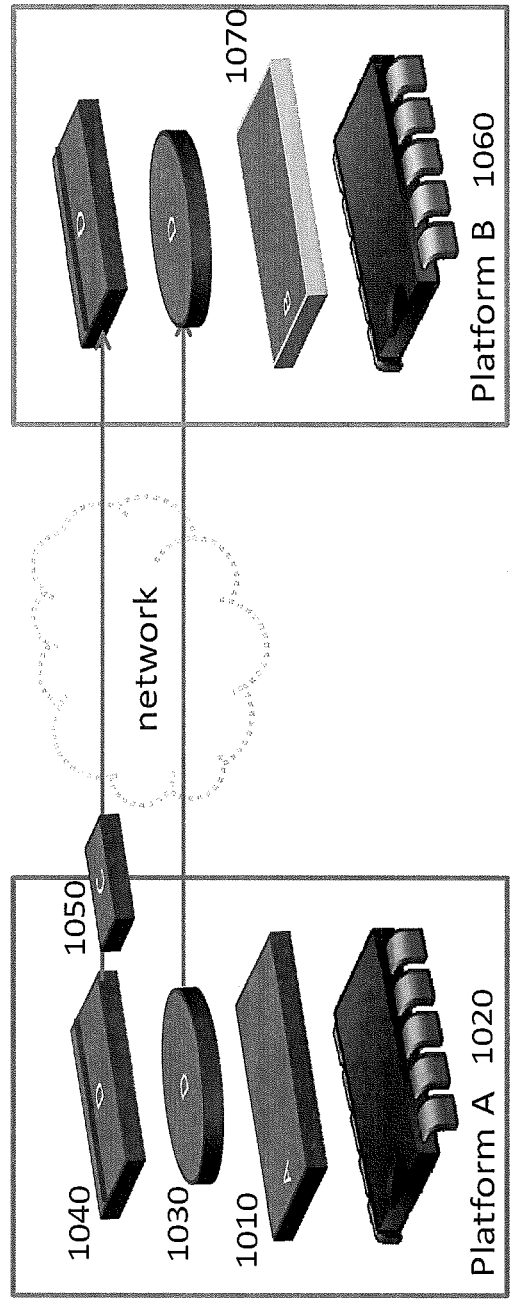
FIG. 10 is a diagram illustrating only porting process accessing data across heterogeneous platforms of the present invention.

FIG. 10 is a diagram illustrating a process of OCIS maintaining the Data in a format native to the source Platform, and translating Schema and Platform representation (and Ontology & programs) between Platforms. The Process optimizes run-time performance by minimizing data format conversions at run time and just transforming Schema, Platform Representation, and Ontology.

Application A 1010, running on Platform A 1020, creates Data D 1030 using Schema D 1040. A common communication protocol 1050 (e.g., using XML, DDS, ASCII, RPC, Java RMI, CORBA or change binary to match target machine) transforms Schema D 1040 so that Platform B 1060 can understand the transformed Schema. Application B 1070 can then interpret the Data D 1030 in Platform A 1020 format using Schema D 1040. This approach avoids conversions when data is frequently moved during run time and transfers the burden to conversion of schema, platform representation, and ontology conversions. Data needs to be converted only when the data is accessed, which optimizes run-time performance by avoiding unnecessary conversions.

FIG. 10 is a diagram illustrating an embodiment of the present invention employing a schema-only porting process to share data across a network between two heterogeneous platforms. The schema-only porting process keeps data in its native format and translates schema and platform representation (e.g., ontology & programs) between varying platforms. The process also optimizes run-time performance by minimizing data format conversions during run time.

As shown by FIG. 10, Application A 1010, running on Platform A 1020, creates Data D 1030 using Schema D 1040. A common communication protocol 1050 (e.g., use XML, DDS, ASCII, RPC, Java RMI, CORBA or change binary to match target machine) converts Schema D 1040 and so that Platform B 1060 can understand the Schema. Application B 1070 can now understand the Data D 1030 in Platform A 1020 format using Schema D 1040. This method eliminates the need to convert the data, which allows for faster and more efficient data transfer between two or more heterogeneous platforms, and prevents the conversion of data unnecessary to Application B 1070. In other words, Application B 1070 can select parts (or segments) of the data needed without having to convert all of the data. Further, even though the Schema D 1040 needs to be converted for Platform B 1060, it only needs to be converted once to continue to understand Data D 1030. Typically there is a lot more data to convert than schema, and therefore a schema conversion does not take up as much processing time comparative to data conversion. Therefore, optimizing data conversion or optimizing which data is converted can dramatically improve system performance.

While a Metalog provides rules for how to convert data in native format into processable forms in an Application, the rules in the Metalog pertain to the structural aspects (e.g., the syntax) of data representation on the source Platform. In modern distributed system architectures, multiple Applications produce data with heterogeneous syntax, each with its own Data Schema in a Metalog. However, the Data in today's System-of-Systems (SoS) can have overlapping meanings in their Data even though they differ in structure and terminology. For example, one Application may produce 3D-coordinate data as the Data Schema "Point3D" with three floating point data fields in Cartesian coordinates while another Application may produce satellite orbit position data as the Data Schema "SatelliteDetection" containing a combination of geospatial coordinates, time, size, velocity, and orientation. Domain experts can recognize that the meanings of these two Data Schemas overlap and that there are Semantic Relationships between the two Data Schema, that is, they form an Ontology. Ontologies have been applied in the computer arts, including Artificial Intelligence, and their programmatic treatment has matured. To serve the needs of data exchange across heterogeneous systems, OCIS provides facilities to: (1) represent the Semantic Relationships between Data Schema to enable representing one or more Ontology (e.g., more than just representing Data); (2) store Ontologies in a catalog (an Ontolog); and (3) allow usage of the semantic mappings inherent in Ontologies in OCIS treatments (e.g., the action of a rule can assert an instance of an Ontology). The capability to reason over patterns of both data and relations allows synthesizing transcendent information from patterns in data streams vis-a-vis knowledge of the domains of the Applications that produced them.

Figure 17:
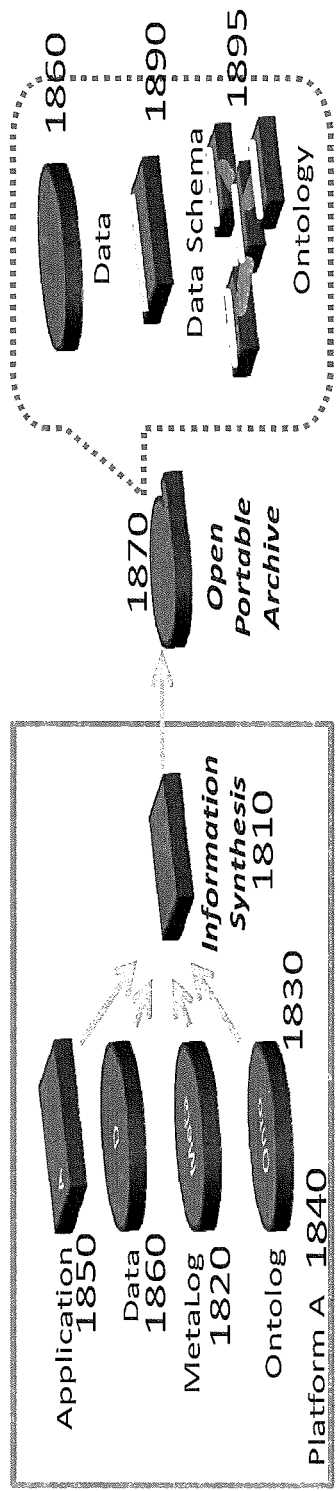
FIG. 17 is a block diagram illustrating metadata ontology management.

FIG. 17 illustrates the ways in which OCIS supports Metalog 1710 and Ontolog 1720 construction. A Metalog 1710 can be created automatically using a MetaGen 1730 program that works on either the executable form 1740 of an Application or on the Source Code form 1750 given the platform hardware 1760 on which the Application is running. Alternatively, a Metalog 1710 can be manually built by a User 1765 who understands both the Application data structures 1770 and the hardware 1760 on which the Application is running Given a set of Data Schema 1780 in a Metalog 1710, a domain expert User 1765 can use an OCIS Ontology Editor 1790 to compose Ontologies by linking them together with Semantic Relations and semantic mapping expressions for matching and composing data into constructs that capture Application meanings (semantics in addition to syntax).

Figure 18:
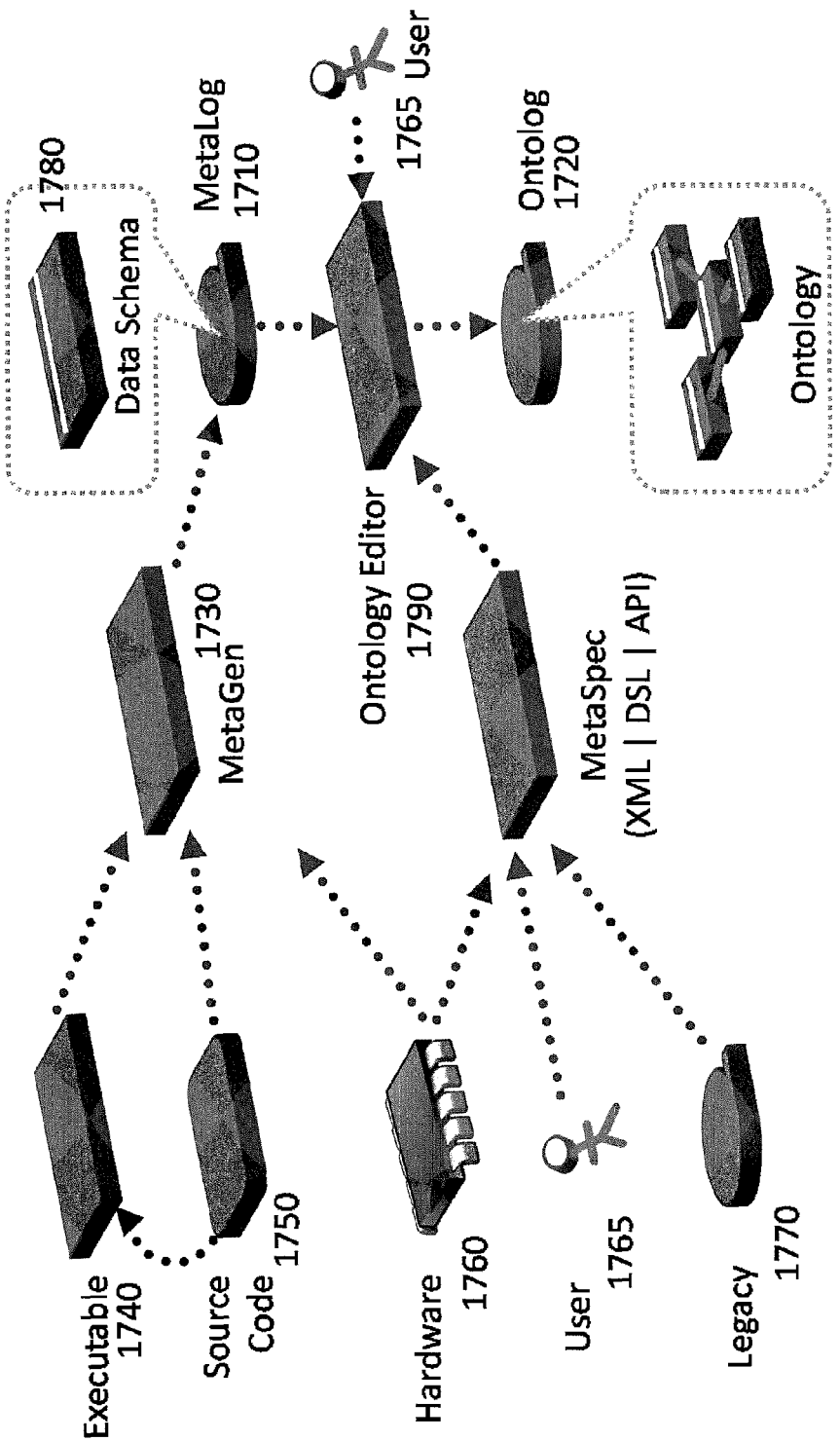
FIG. 18 is a block diagram illustrating a process that stores Metadata & Ontology with Data in platform-native format, optimizing run-time performance and enabling open information access across computing platforms.

Optimized Run-Time Archives through Data, Metadata, and Ontology Synthesis. FIG. 18 shows a method of archiving information optimized for run-time performance with open, self-describing information, and platform portability. An Information Synthesis 1810 process pre-populates an archive with the pre-constructed Metalog 1820 and Ontolog 1830 specific to Platform A 1840 and the Application 1850. While running, the Application 1850 passes (e.g., copies without translation) Data 1860, in a Platform-A native format, to Information Synthesis 1810. Information Synthesis 1810 inserts the native format data into the Archive 1870. The resultant Archive 1870 contains Application Data 1860 and the Data Schema 1890 and Ontology 1895 for that Data 1860. The Data 1860 is open to interpret and platform portable because the platform-specific Data Schemas contain the information necessary to interpret the data from any platform and the Ontology 1895 contains the semantic information to understand the data relations. The Application 1850 run-time performance is optimized because the data is moved to the archive in its platform-native form without conversion. This process eliminates the need for data post-processing to translate the data when moving it between platforms.

Figure 3:
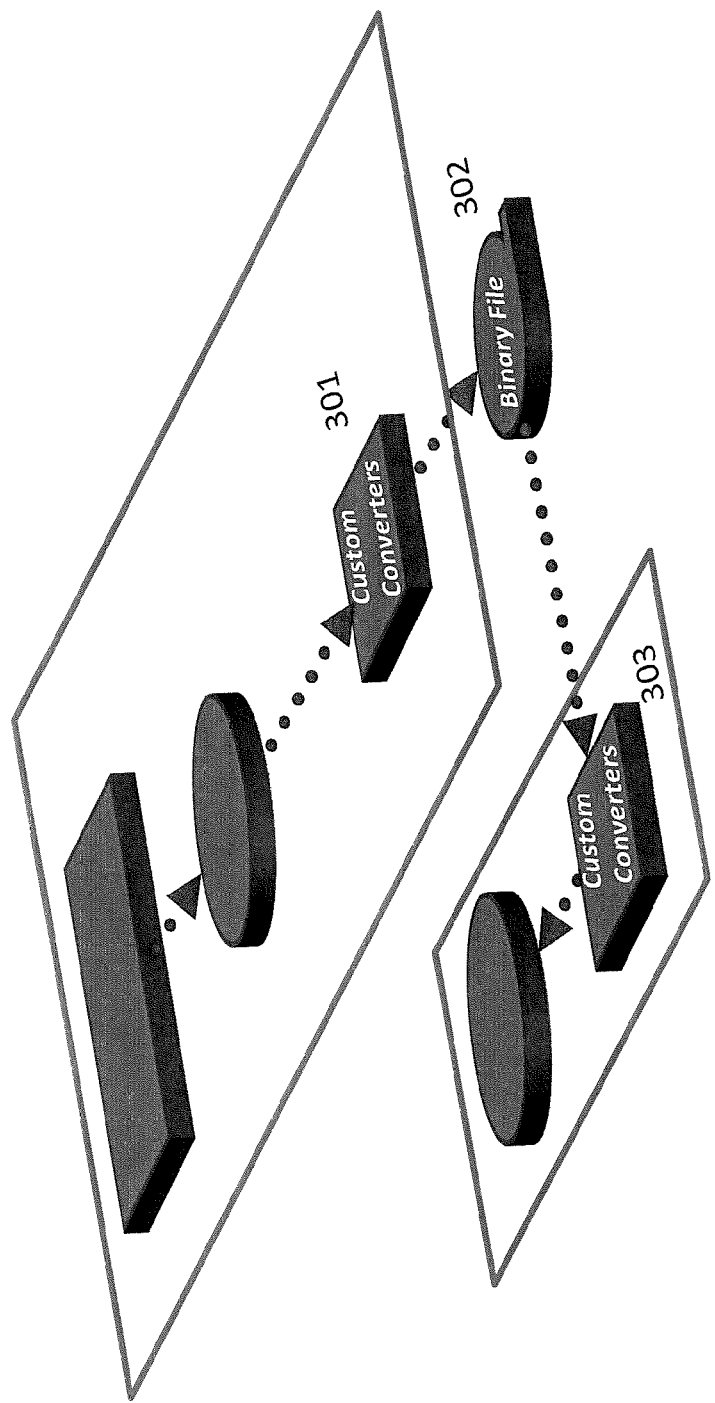
FIG. 3 is a diagram illustrating an Application using a conventional Data Collection and Data Reduction process.
Figure 4:
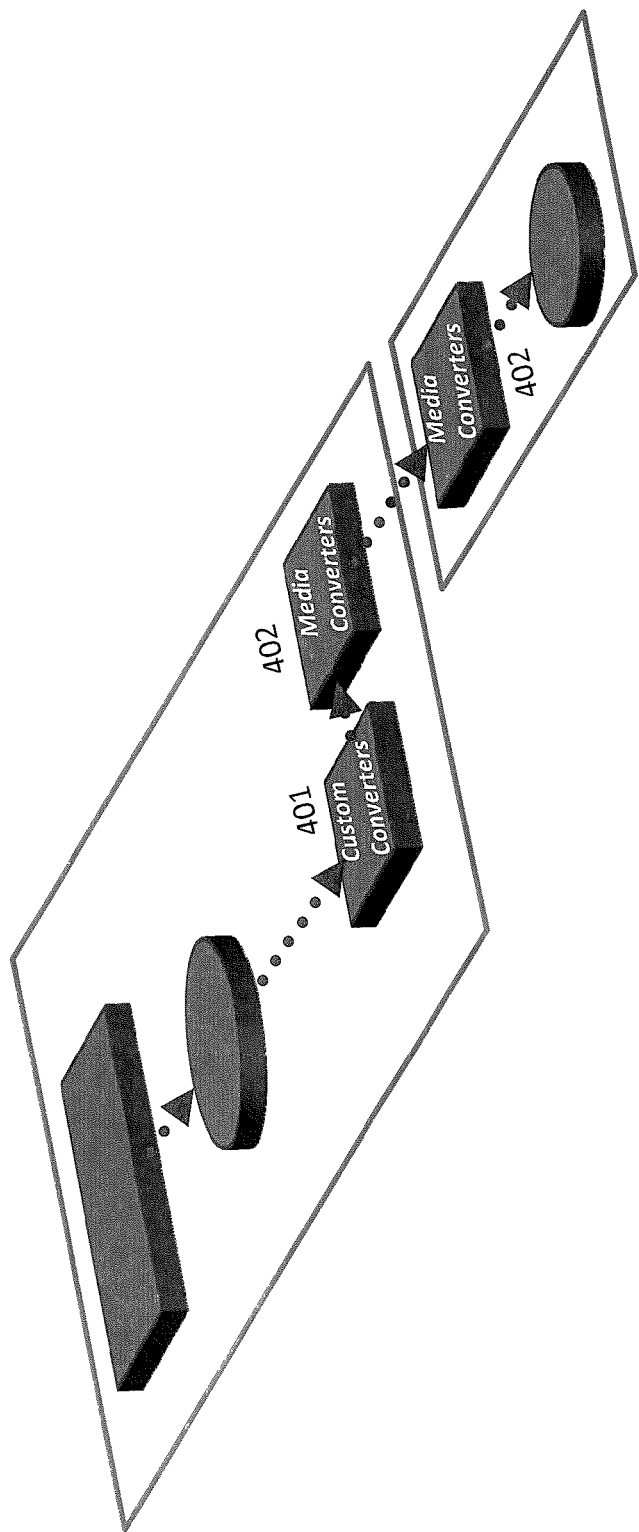
FIG. 4 is a diagram illustrating a conventional method of distributing data between platforms.
Figure 5:
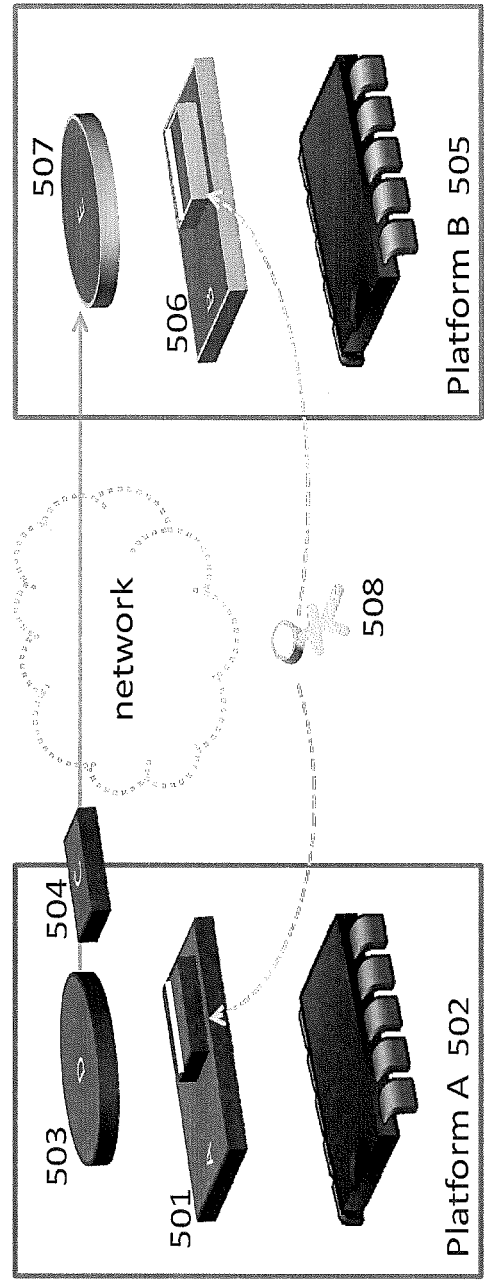
FIG. 5 is a diagram illustrating the state-of-the-art in data porting process between Applications on two separate computing Platforms.
Figure 6:
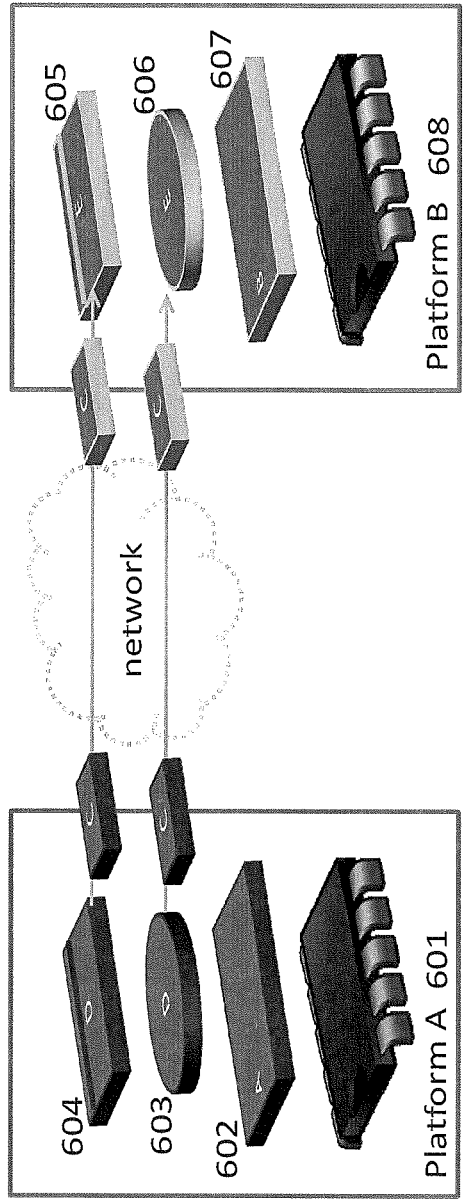
FIG. 6 is a diagram illustrating the state-of-the-art in data and schema porting process between Applications on two separate computing Platforms.

In an embodiment of the present invention, a framework allows a User to instrument an Application with data capture, data distribution, and data treatment directives. The upper part of FIG. 7 illustrates the conceptual elements of the framework and the operational flows among them. The lower part of this figure is summary of conventional practices as described in FIG. 3 and FIG. 4, above.

OCIS uses native format data in all data flows to minimize, the overhead associated with custom converters and media converters. Data fields need conversion only when they are to be used to evaluate an expression. The result of this decision is that data capture and data distribution require only the copying of memory, which is a fast operation compared to any custom converter or media converter. The critical part of OCIS is providing facilities for converting any selected data field from its native data format into a computational form that is suitable for use in program expressions. The information for this conversion is data about the data, metadata; it is a specification for how data is defined. A common software naming convention for specifications of how entities are defined is a "schema". Therefore, in OCIS, this metadata is referred to as a "Data Schema". For a given set of applications, a Data Schema is defined for each type of data created within an OCIS embodiment. Each Data Schema is assigned a unique integer identifier for metadata management purposes.

The Data Schemas are stored in a catalog, which is referred to as a "Metalog." A Metalog contains a set of Data Schema for use by OCIS. A Metalog can be created in various ways, for example, eXtensible Markup Language (XML) 801, Domain Specific Languages 802 (e.g., DSL for Data Schema Definition), Application Programming Interfaces (APIs) 803, and Metalog Generation Programs (MetaGen) 804. The process for creating a Metalog 702 has been generalized in OCIS and named "Metalog Composer," in FIG. 7, which converts data into a Data Schema and then adds the Data Schema to a Metalog 702.

Table 1, below, describes several existing embodiments of the Metalog Composer. FIG. 8 illustrates how the Metalog Composers can be used to convert Application artifacts into Metalog Data Schema representations, or convert Application artifacts into an Ontolog.

TABLE 1

Example Embodiments of the Metalog Composer

| Class of Metalog Composer | Data Specification Form | Data Specification Syntax |
|---|---|---|
| XML | XML for Metalog Definition | XML |
| DSL | DSL for Data Schema Definition | ASCII Text |
| API | Programming Language | C++ |
| MetaGen | Application Source Code | C++ |
| MetaGen | Compiled Application | Ada |

Data Schema are bounded hierarchical trees of data-field-properties. XML tags can readily be set up to identify those fields and properties, and XML files can be composed for Data Schema. An XML parser 805 written for the structure of a Metalog 702 can read those files and build a language-specific incarnation (e.g., a C++ object) of the Metalog. The person composing the XML file should understand how the data fields are organized in Program memory on a given Platform.

Figure 9:
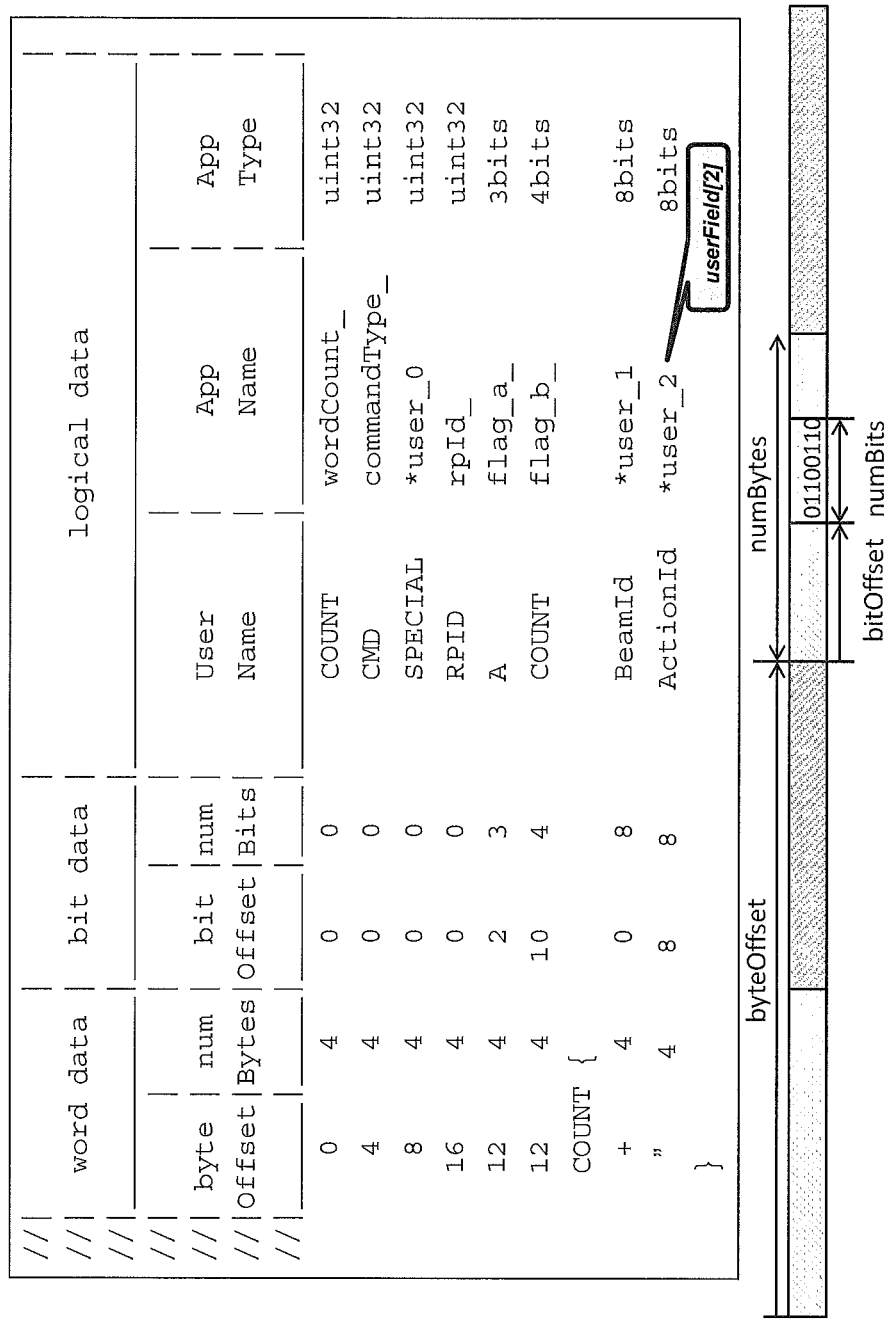
FIG. 9 is a data representation illustrating an example of metadata.

A DSL for Data Schema Definition 806 enables representation of a bounded hierarchical trees using a simple, tabular ASCII file, as illustrated in FIG. 9. This DSL leverages the fact that the curly bracket token and multiplicity indicators are ubiquitous in the software engineering domain and therefore provide a familiar syntax for defining Data Schema. The person composing the DSL file understands how the data fields are organized in Program memory on a given Platform.

An API 803 provides a programmatic technique for defining Data Schema and building a Metalog 702. In this approach a programmer builds a module that contains data values of Application objects from which data capture are performed and uses the API 803 to set up the mapping from the data fields into the in-memory layouts of Data Schema. This technique requires that the programmer selects the Application structures to be copied from memory, but has the API 803 ascertain how the data fields are organized in Program memory on a given Platform.

A MetaGen 804 process automatically converts Application artifacts into Metalog Data Schema representations and adds them to a Metalog 702. Two techniques for a MetaGen process are disassembly and parsing. The disassembly technique considers executable artifacts generated by compiling the Source Code 807 of an Application and analyzes them for syntactical constructs that define the Data Schema of the Application. The Source Code parsing technique applies introspection tools to the Source Code 807 and creates the inventory of data structure definitions, from which the Data Schema can be selected. Depending on the programming language of the Application, introspection can be readily applied (e.g., Java has introspection built into the programming language) or may require special techniques (e.g., C++ doesn't have introspection and requires the application of a mix of tools to expose the Data Schema). The MetaGen 804 program understands how the data fields are organized in Program memory on a given Platform. This can be achieved by compiling and running the MetaGen 804 on the same Platform as the Application from which Data is captured.

For the purposes of this discussion, the terms "source" and "target" are used to identify roles played by data capture and data treatment, respectively. FIG. 7 illustrates data capture on Platform A and data treatment on Platform B. However, capture and treatment can be mixed and combined arbitrarily across a system or multiple systems. For example, a User can arrange for both capture and treatment to happen in a single Process, or a User can have a treatment response include additional capture and distribution. This can spread concurrent computations further throughout the network.

A method of gathering data from the source Application includes:
 a) instrumenting the Application (e.g., revising the source code for a set of data gathering requirements),
 b) configuring the capture and distribution actions for any particular application run,
 c) running the source Application to extract data from within the source Application, and
 d) distributing the data to any number of concurrent Platforms.

A method of handling data at the target Application includes:

a) configuring the data treatment actions, and
b) running the target Application to receive data streams distributed by sources.

The only activity needing source code revision is instrumenting the Application for a given set of data gathering requirements. All other activities are accomplished by setting up configuration files, which minimizes costs of software Application development with OCIS. To instrument the application, a User inserts data capture operations into the Application prior to running the Application. The data capture operation takes, as arguments, the Data Schema identifier and the extents of native data memory to be copied into the OCIS capture buffer.

The left hand side of FIG. 7 shows operational flows in a source Platform (Platform A). Prior to running the Application, a User configures the filters and distribution directives to be applied to data capture. A data filter is a software mechanism that contains acceptance criteria dependent on the system load. A default data filter allows a User to turn capture off or on, and to set hiatus (inactive time periods) and stride (number of extraction attempts to skip). Hiatus and stride can be specified for different load levels or system configurations (example four system load levels: 0-25%-50%-75%-100%). OCIS provides a software framework extension point where a User can inject custom acceptance criteria. A distribution directive is a set of configuration parameters that specify for any given Data Schema identifier any number of destinations on target Platforms to which the captured data are sent. A User can configure the data filters for both data capture and data dispatching.

Data Capture and Distribution. When an OCIS-instrumented Application is run, whenever a data capture operation is invoked, the Application memory referenced in the capture call may get copied into an OCIS buffer, subject to filter criteria registered at startup. If capture is enabled, the data is submitted to the local treatments and is distributed to any target Applications.

Various data treatments can be applied to data as it arrives at a target Application. The technique is to encode a sequence of generic operations in the software framework that invoke application tools tied to the OCIS framework. A User composes configuration files to specify how to set up these tools and how to extract data fields from the input streams of native data in terms of metadata selectors derived from the Data Schema for the given data. Further details of the data treatments are described below.

A User specifies in configuration files which treatments to apply to which Data Schema identifiers along with the control settings of the treatments at the target platform. A User can configure filters for both data ingest from remote sources and local data archiving.

FIG. 7 illustrates operational flows in a target Platform (Platform B). At startup, OCIS reads into the Representation Processor 703: a session configuration file, rules from a CEP Knowledge Base (KB) 704, and ontologies from an Ontolog 705. The configuration parameters can contain references to Data Schema identifiers and expressions that contain data field selectors in terms of the associated Data Schema. During a run, data from source Applications is received by the Representation Processor 703. OCIS interprets the Data Schema in the received data and uses it to evaluate the ingest filter associated with the identifier. If the ingest filter shows that processing is enabled, OCIS fetches the list of treatments to be applied, uses the data field selectors to bind data to the treatment operands, and applies the treatment. In the backbone operational flow, CEP 706 is applied first. CEP binds data field values to variables in the condition clauses of each applicable rule and executes the actions of rules that "fire." Action expressions can set the values of data fields, retract entire data items, and assert new data instances of any Data Schema. The CEP "assert" function allows semantic deduction of higher semantic representations implicit in the originating source data.

Next, the Information Synthesis engine 707 is applied to the data stream. The Information Synthesis engine is an ontology processor that inspects the patterns of accrued data in the context of its temporal provenance and its semantic similarities with the resident ontologies. Based on the semantic similarities and time proximity, the Information Synthesis engine 707 applies semantic mappings that synthesize new information from the accrued data. The ontology-based semantic mappings enable heterogeneous data from systems-of-systems (SoS) to be homogenized into the common vocabulary of the domains of inter-related communities of interest (COI). As the final step in the operational flow, based on archiver configuration files (e.g., both filter settings and the mapping of Data Schemas to archiving directives), the OpenArchive 708 allows the storing of data in open standard formats.

Figure 11:
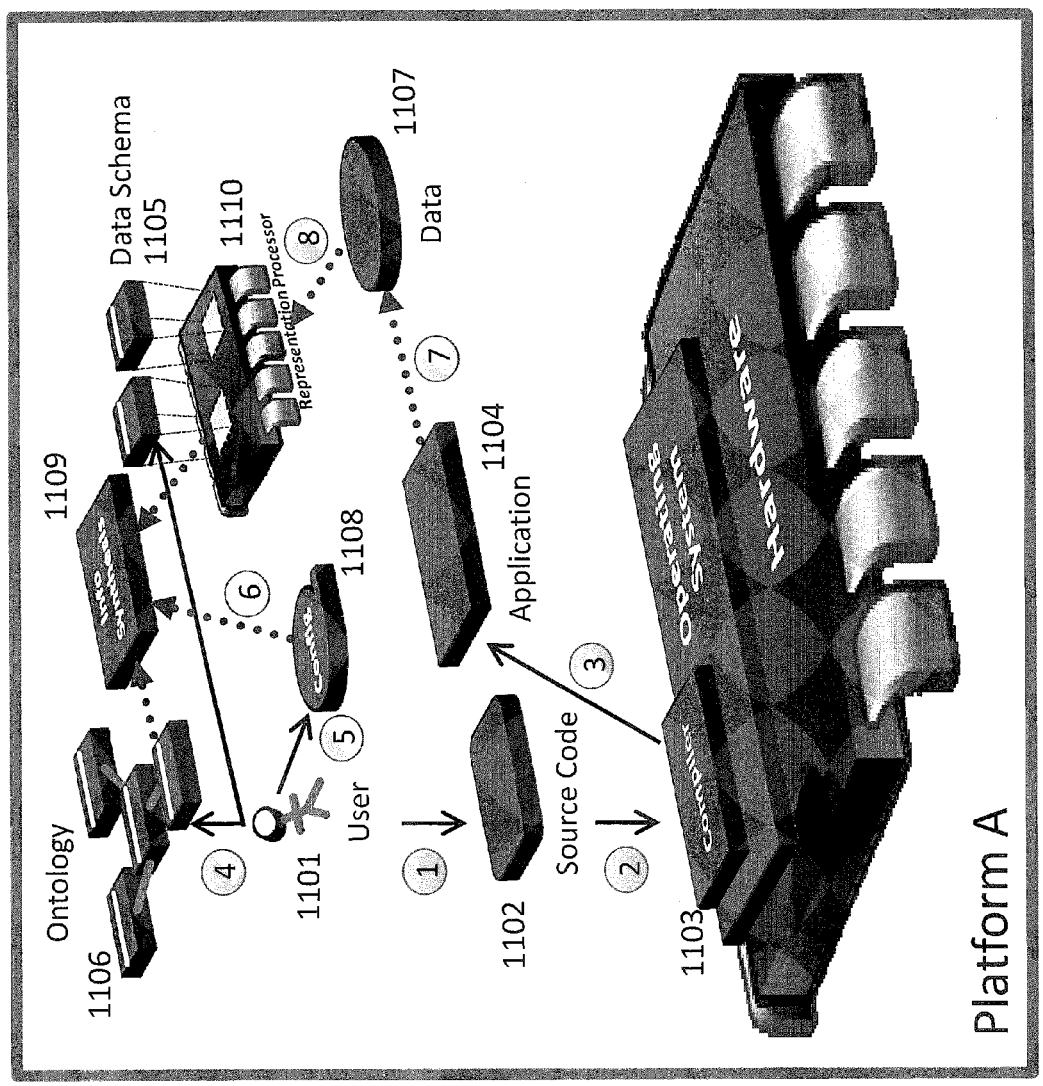
FIG. 11 is a diagram illustrating data schema and ontology specifications synthesizing information from data.

FIG. 11 is a diagram illustrating augmentation of the construction and execution of Applications by embodiments of the invention. The construction of the application is the same: (1) the User 1101 writes the Source Code 1102; (2) the User 1101 invokes a Compiler 1103 on the given Platform on the Source Code 1102; and (3) the Compiler 1103 creates the Application 1104 executable program. However, prior to running the Application 1104, the User 1101 defines the Data Schema 1105 and Ontology 1106 for the information that the User 1101 wants OCIS to use to synthesize information from Data 1107. The user 1101 definition (4) only occurs once for any given Data Schema 1105 definition and associated Ontology 1106 representations. Prior to any Application 1104 run, the User 1101 sets up configuration files 1108 to indicate which Data Schema 1105 treatments and Ontology 1106 semantic mappings to use in the Info Synthesis engine 1109. At runtime, as usual, data 1107 is extracted from the Application 1104 in native format (7) and also passed into the OCIS Representation Processor 1110 (8), which uses the Info Synthesis engine 1109 to apply its Data Schema 1105 treatments and semantic mappings.

Figure 2:
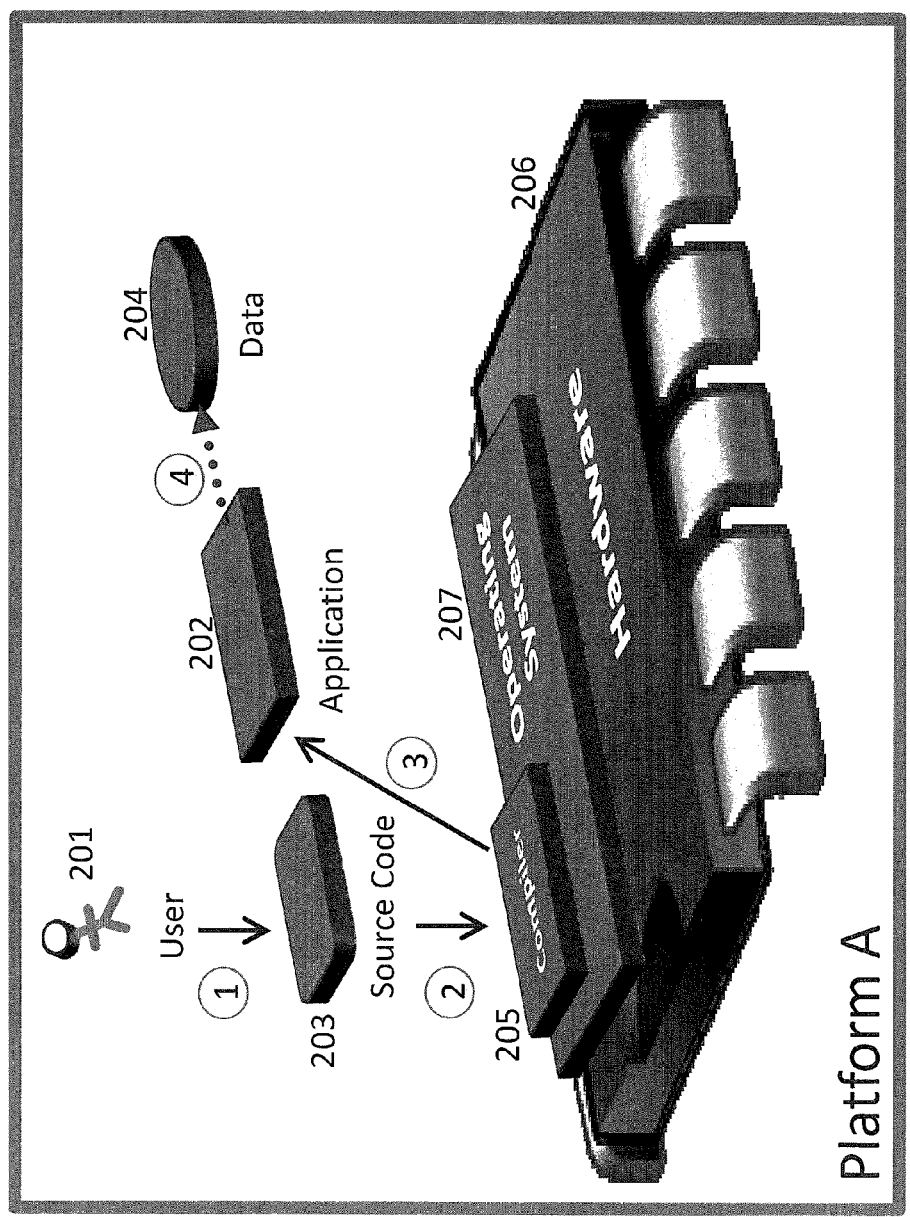
FIG. 2 is a diagram illustrating conventional application compilation and execution.

Application Construction View of the OCIS Conceptual Model. FIG. 11 is an elaboration of FIG. 2 illustrating the compilation and execution processes of OCIS. In the conventional approach, a User 1101: (1) writes Source Code 1102; (2) compiles the Source Code (including custom converters and media converters) into modules; (3) links the modules into an Application Process 1104; and (4) runs the Application 1104, which produces the data for consumption by custom converters and/or media converters. The Application Compilation (1-3) is not changed when using OCIS, except for (2), which does not require the development of custom converters or media converters. At application execution when using OCIS, there is no need for custom converters or media converters because data is captured and distributed in native form. To allow this, additional pre-execution activities (4-6) are employed. This affords the opportunity for generic, source-code independent treatments (7-8), as shown in FIG. 11. The Representation Processor 1110 converts native format data fields as needed by the Information Synthesis 1109 treatments using corresponding registered Data 1107.

Complex Event Processing allows users to write declarative rules ("condition-action" expressions) in terms of the Data Schema. The condition part of a rule binds source Data Schema field selectors to captured Data values and evaluates a logical condition expression. If the logical condition evaluates to true, then the action expressions are executed. Action expressions can contain computations using values bound to target Data Schema, the creation of new events (e.g., deduced Data Schema and Ontology instances), and the retraction of the event being handled.

Figure 13:
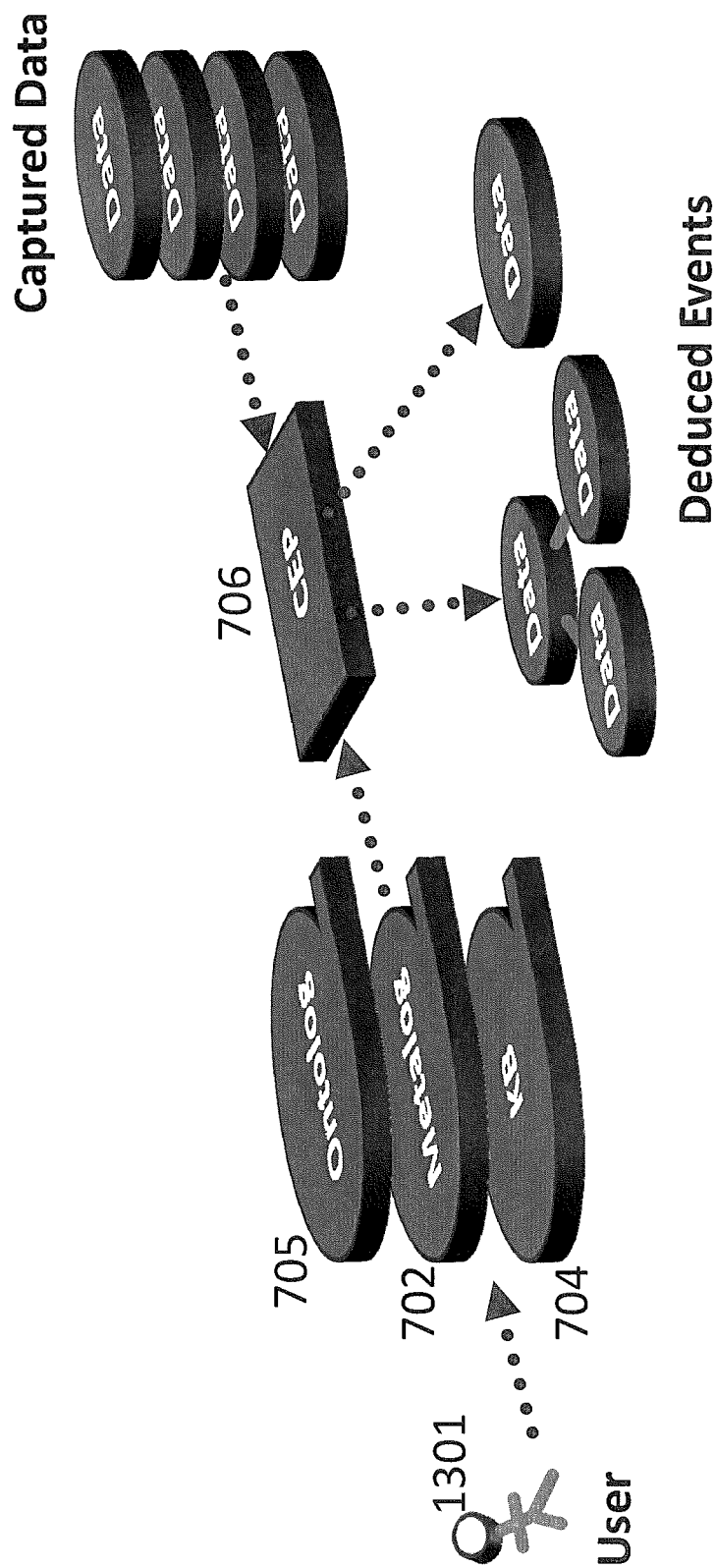
FIG. 13 is a diagram illustrating a method of analyzing data in its natural form.

FIG. 13 is a diagram shown illustrating an operational flow view (FIG. 13). A User 1301 can refer to the Data Schema definitions that are available in the Metalog 702 as well as the Semantic Relationships in the Ontolog 705. The rule grammar allows expressions that involve data field patterns (e.g., Data Schema) and Data Schema patterns (e.g., Ontologies) along with their relative validity times. The CEP engine 706 retains sliding time windows of CEP-involved Data Schema in its working set. The extents of these sliding time windows are deduced by the CEP engine 706 at startup for each Data Schema identifier named across all rules such that data values falling behind the current time beyond the time window extent can be dropped from the working set. Data values for which no CEP rules have been loaded do not have to be retained in the working set.

Figure 14:
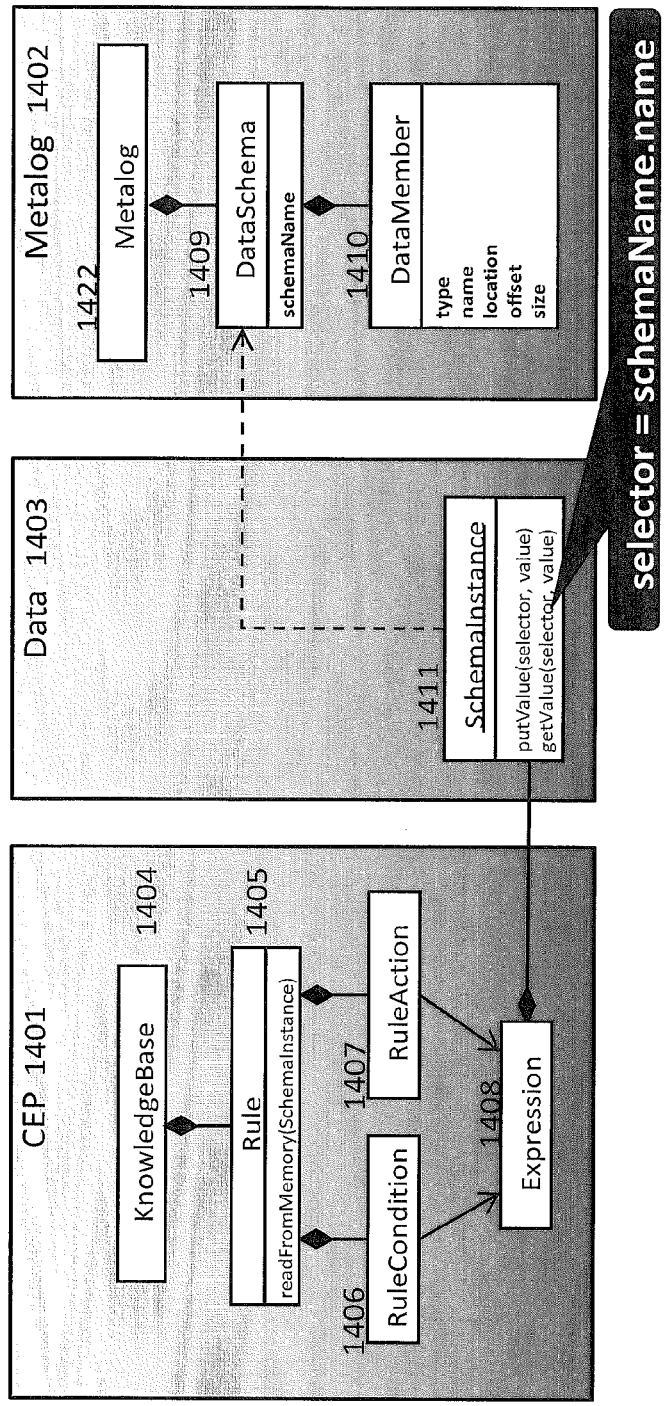
FIG. 14 is a block diagram illustrating stream manipulation with rules.

FIG. 14 is a class diagram illustrating this operational flow. There are three domains: CEP 1401, Metalog 1402, and Data 1403. The CEP domain 1401 defines a KnowledgeBase 1404 that contains a collection of Rules 1405. Each Rule 1405 has a RuleCondition 1406 and a collection of RuleActions 1407. RuleConditions 1406 and RuleActions 1407 contain any number of Expressions 1408. The Metalog domain 1402 defines a Metalog 1422 that contains a collection of DataSchema 1409, each of which contains any number of DataMembers 1410. Each DataMember 1410 specifies its access form and prescribes how its value is stored in native memory. The Data domain 1403 ties the Expressions 1408 in the CEP domain 1401 to the DataMembers 1410 in the Metalog domain 1402. In particular, the Data domain 1403 defines a SchemaInstance 1411, which provides the mapping mechanism between values in the native format and the field selectors used in the rule Expressions 1408. The Representation Processor 703 creates a SchemaInstance 1411 on the native memory of a data item when it arrives in the CEP stream and provides it to the applicable Rules as an argument to the Rule 1405 method "readFromMemory(SchemaInstance)." This method contains the generic rule processing logic.

OCIS enables a User to place data filters at various points in data streams. Data filters can be at data capture points, at data dispatch points (sources), at data ingest points (targets), and at data archive points for example. These data filters can remove data from further processing, for example, to reduce throughput when system loads (e.g., network utilization) become critical or the Processor of a target Platform is much slower that the Processor of a source Platform. CEP can also serve as a filter by specifying rule actions that retract events. Conversely, CEP can also add events to streams by having actions that assert events, that is, they can elaborate the stream. In an analogous manner, Information Synthesis can infer new, more elaborate forms of information from patterns of related data. As treatments are added to an OCIS system in general, data streams can be downsized or elaborated depending on how those treatments have been configured. Collectively, any mechanism for downsizing or elaboration are referred to as "stream filters" in OCIS.

Figure 15:
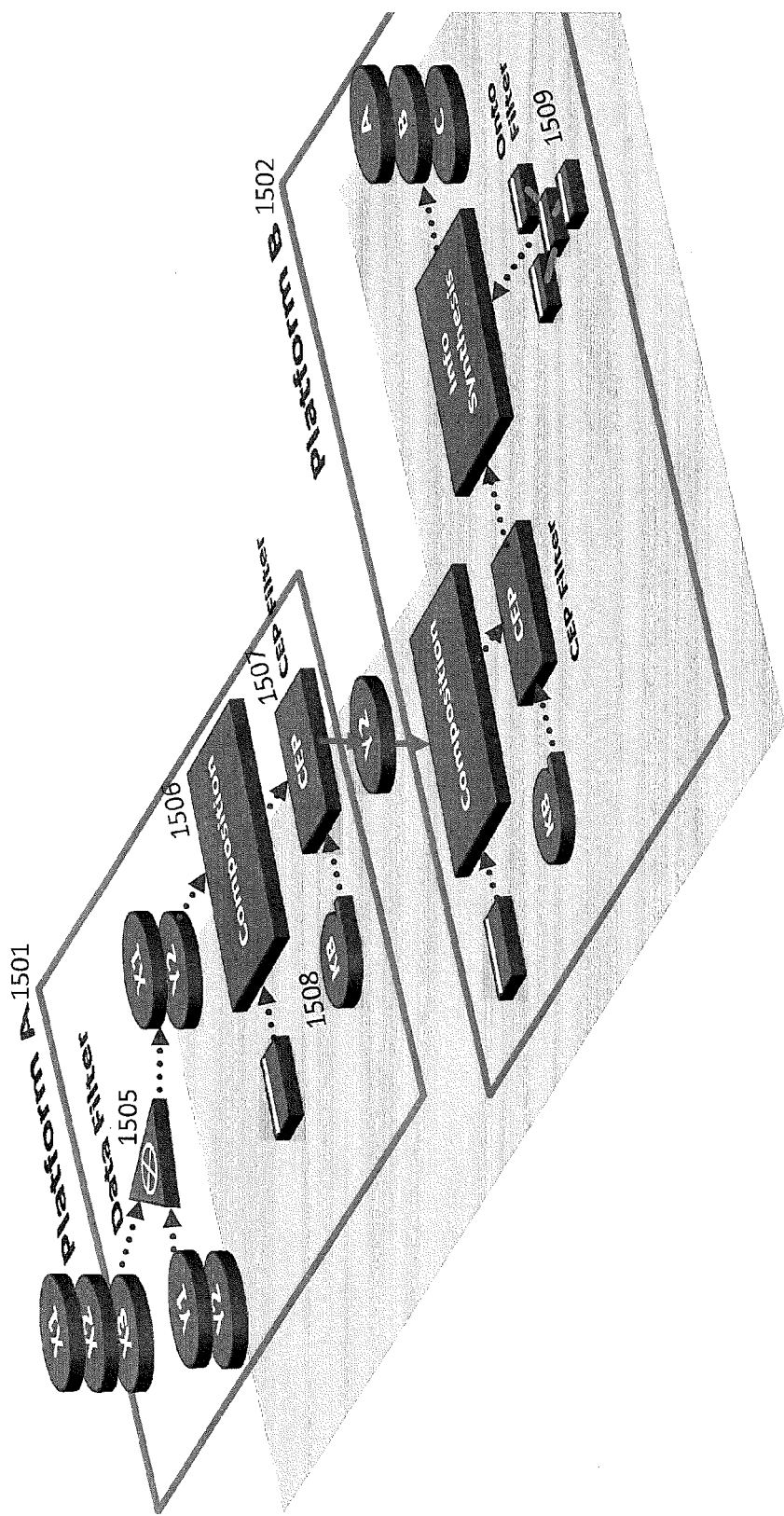
FIG. 15 is a diagram illustrating culling data to enable consumption by slower processors to optimize what is archived, and to reduce network utilization.

FIG. 15 is a diagram illustrating an example scenario demonstration such filtering. In this scenario, Platform A 1502 is the source Platform; Platform B 1502 is the target Platform. Platform A is originating streams for two Data Schemas. The upper stream has three data records of Data Schema X coming into the data capture filter 1505. The lower stream has two data records of Data Schema Y coming into the data capture filter 1505. The data filter is configured with criteria that downsize the stream to only the first data record of X and the second data record of Y for processing on a local Representation Processor. The local Representation Processor uses the Data Schemas associated with the data records to create a Schema Instance on the native data (Composition) 1506 and passes it to the CEP engine 1507. In this example, one of the Rules from the KB 1508 has retracted one of the data records (X1), so that only one data record is passed to the dispatch function (Y2). The ingest mechanism on Platform B 1502 receives the data record and passes it onto the treatments that have been configured on Platform B 1502. In this scenario, an ontology filter 1509 analyzes the accrued pattern of data and relations and deduces a new level of information (data records of Data Schemas A, B, and C) though its semantic mappings.

The multiplexors and demultiplexors in OCIS can redirect data streams using the source-to-target configuration settings. The multiplexors can facilitate distributed processing across clusters of heterogeneous Platforms to perform tasks (e.g., OCIS treatments) in parallel where each Processor can handle the kinds of tasks for which it is best equipped. Then, when all participating tasks have been completed, OCIS uses demultiplexors to combine the results into the final results.

Figure 16:
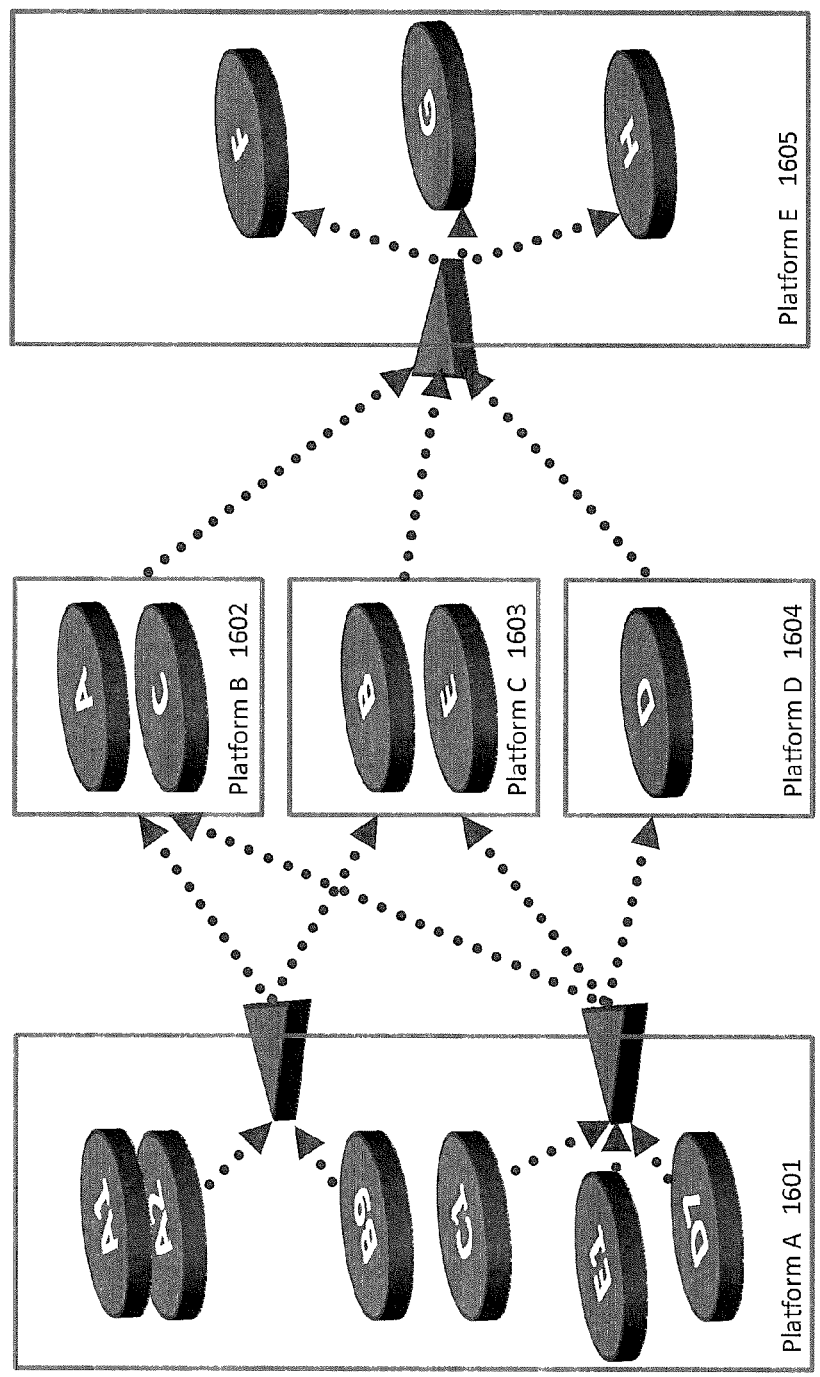
FIG. 16 is a diagram illustrating the process of scalable heterogeneous computation by distribution of data in its natural form.

FIG. 16 illustrates an example embodiment of parallel processing. Platform A 1601 redirects streams of data of Data Schemas A and C to Platform B 1602, redirects data of Data Schemas B and E to Platform C 1603, and redirects data of Data Schema D to Platform D 1604. The Representation Processors on these middle tier Platforms have been configured for OCIS treatments for which the Processor is best equipped. For example, the Representation Processor on Platform B 1602 may have been configured to apply CEP rules that pertain to Data Schemas A and C, the Representation Processor on Platform C 1603 may have been configured to apply Ontology assessments that pertain to Data Schemas B and E, and the Representation Processor on Platform D 1604 may have been configured to perform plotting of data of Data Schema D. After each middle tier Platform completes its treatments, it becomes a source Platform relative to Platform E 1605, which uses a demultiplexor to apply its treatments to the accumulated results, producing data of Data Schemas F, G, and H.

Figure 19:
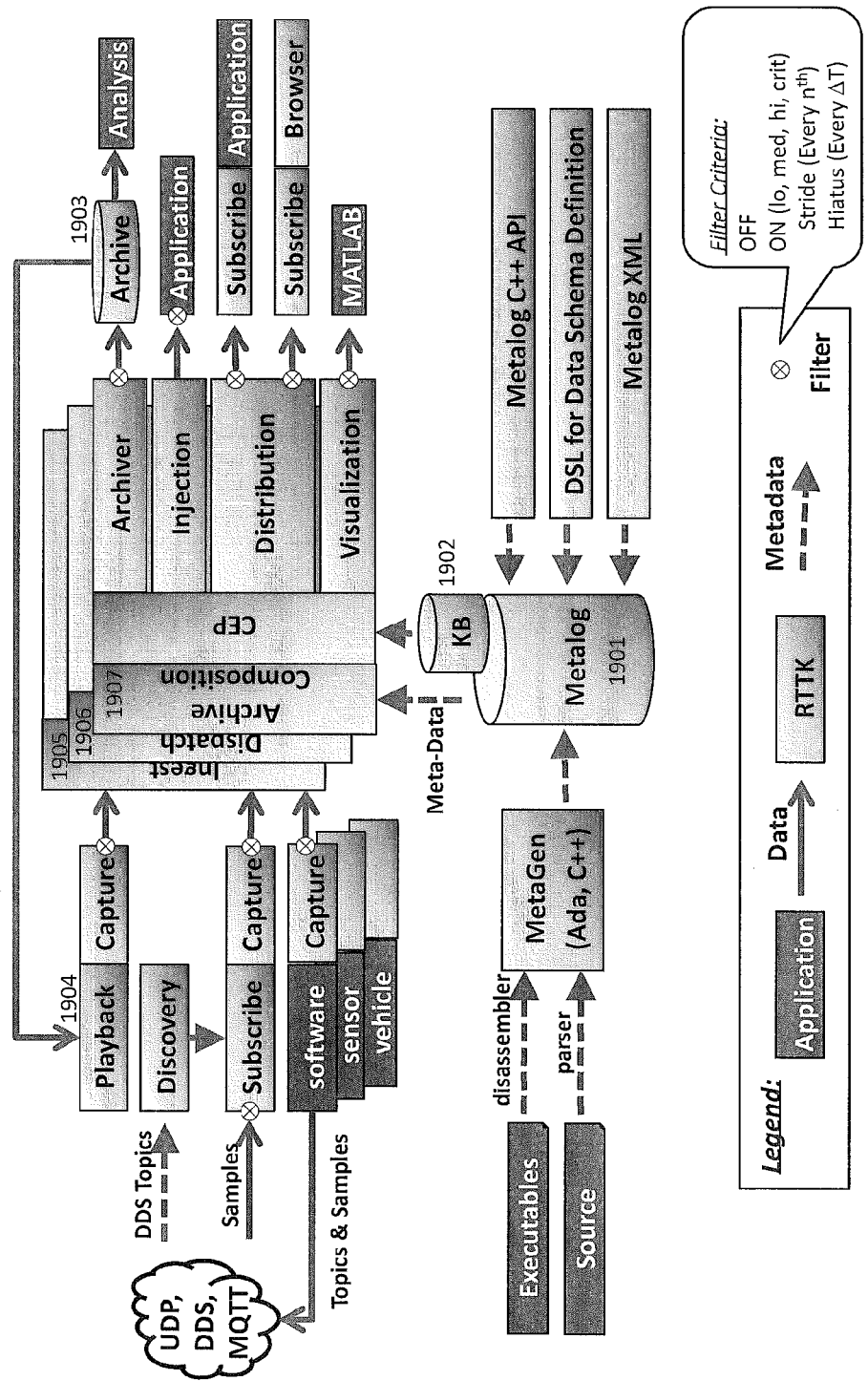
FIG. 19 is a diagram illustrating usage of elements of the invention.

FIG. 19 is a functional block diagram a Real-Time Took Kit (RTTK). A Real-Time Tool Kit (RTTK) is an implementation of OCIS that has been developed for use in Linux systems, but could be applied to other operating systems or systems in general.

The lower part of FIG. 19 illustrates the five methods for creating a Metalog 1901, as outlined herein. Given a Metalog 1901, a User can compose a set of rules containing expressions based on Data Schema definitions and store them in a knowledge base (KB) 1902. FIG. 19 data flows from left to right as indicated by the arrows, with the exception of the flow of data from the Archive 1903 to the Playback 1904 function. This flow illustrates that entire data capture sessions can be stored and later retrieved for playback as a ready-made scenario machine for various purposes. Scenario playback is a valuable tool in systems development and usage, for example, iterative development of treatment configurations, training, system testing, etc.

The stack of three compound blocks in the center of the diagram represents the three stream control functions: Ingest 1905, Dispatch 1906, and Archive 1907. Each stream control function can contain any of the treatments that comprise the information synthesis engine (CEP, Archiver, Injection, Distribution, Visualization, etc.). Using configuration files, a User can select any number of the treatment functions to be applied to Data for any Data Schemas (via the Data Schema identifier) for each of the three stream control functions. A User also uses configuration files to set the controls for how the treatments operate on the data streams.

Figure 12:
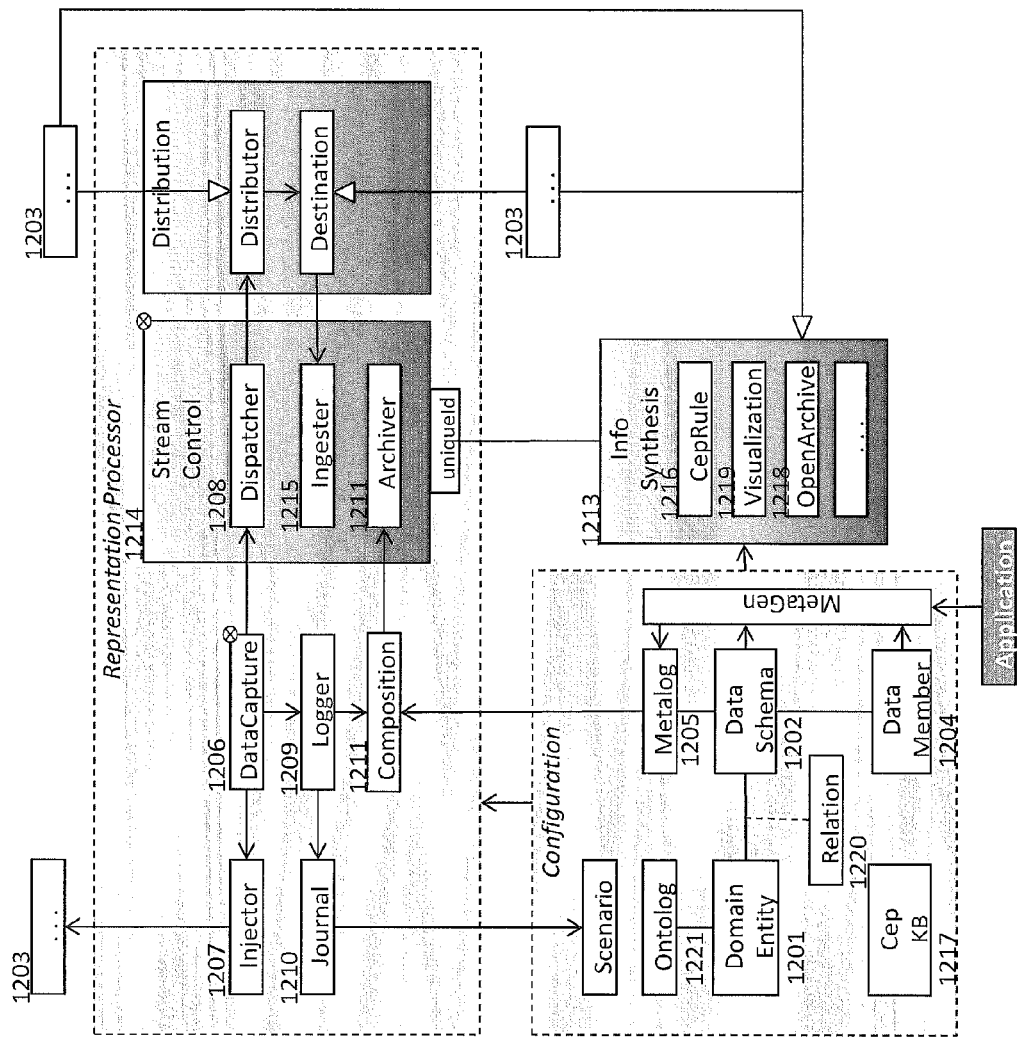
FIG. 12 is a diagram illustrating a UML-based architecture of one embodiment of Ontology-Based Concurrent Information Synthesis.

FIG. 12 is a class diagram illustrating the architectural backbone of one embodiment of the Ontology-Based Concurrent Information Synthesis system. The notation is largely that of the Unified Modeling Language (UML), with some additional changes. White boxes having black text represent classes. Gray boxes having white text represent application programs. Gray boxes having black text represent functional areas. The lines that connect the boxes are relationships. There are three kinds of relationships: data flow (represented as arrows with open barbs), inheritance (represented as arrows with white triangular barbs), and association (non-arrows). The association between the DomainEntity 1201 and DataSchema 1202 classes has another class associated with it that specifies the semantic details of how sets of DataSchema 1202 are related to a DomainEntity 1201; this construct is called an association class in UML. Beyond UML, FIG. 12 uses nesting of boxes to indicate that the contained boxes are sub-areas of the outer boxes and inherit the relationships of the outer boxes. Boxes with ellipsis text ( . . . ) (e.g., 1203) are placeholders that indicate extension points where users can add specializations and realizations to customize the framework for their own application needs.

This Information Synthesis system is based on the ability to express the structure and meaning of data as sets of rules that prescribe data layouts and how the numerical and logical aspects of the data can be combined to synthesize information (recursively). Three levels of rules are available: structure rules, condition-action rules, and ontology-mapping rules. These rules are discussed below.

The lowest set of rules encodes how memory in a program stores the data, which are metadata rules because they are data about data. A widely-used term for this kind of metadata is "Data Schema", which is the name assigned to the UML class in the model. A data item in a program usually quantifies and describes a real world things, event, or process and can have multiple facts associated with it. Each fact about a data item has a value and a type and a specific memory space in a program. Accordingly, in the model, the layout and interpretation of each distinct fact of a DataSchema 1202 class is a DataMember 1204, and a DataSchema contains one or more DataMember objects. A set of DataSchema definitions are collected into a catalog, that is, a catalog of metadata, hence the Metalog class 1205 in the model. The user assigns a unique integer number to each DataSchema in a Metalog. A Metalog for a given application can be created manually, for example, from an XML file, programmatically using an Application Programming Interface (API), or automatically from language-specific tools using a MetaGen class (program).

Data Capture and Distribution. Given an application, a user can instrument an application by simply adding Data-Capture 1206 functions that indicate the program memory and the unique integer identifier of the DataSchema 1202 in the Metalog 1205 associated with the application. The DataCapture class 1206 has a circle-with-cross adornment in its upper right corner, which indicates that the behavior of this class is subjected to a data filter at runtime. A data filter contains user-specified criteria that controls whether an instance of the identified DataSchema 1202 instance is processed or will skipped. The user can specify three kinds of criteria (e.g., off, stride, and hiatus) at four levels of system load (e.g., low, medium, high, and critical). Stride is an integer value, N, specifying that processing is performed every Nth time that DataSchema 1202 is encountered. Hiatus is an integer value, T, specifying that processing is performed every T milliseconds. The system load level is user-configurable but the default cutoffs are set to the percent of collection store available in the DataCapture class 1206: 25%, 50%, and 75%.

After extracting the native memory of a data item, Data-Capture 1206 performs three actions. First, it passes a reference to the data to an Injector object 1207, which calls an optional end-user function that can perform application-specific processing, as desired. This functionality allows users to tap into the DataCapture 1206 streams at will. Second, the DataCapture 1206 passes a reference to the data to zero or more Dispatcher objects 1208 that have been registered with the given DataSchema identifier (e.g., registration is done with user-defined configuration files at startup). A Dispatcher 1208 sends the given data to an Ingester 1215 which has been registered with the Dispatcher 1208 (e.g., from user-defined configuration files at startup) subject to any specified data filters. Ingesters typically run concurrently in remote processes, enabling readily scalable information synthesis. The user can also specify data filters on Ingesters to performance tune the remote listeners. Third, the DataCapture 1206 copies the native memory into one of its data collection buffers that are used by a separate Logger 1209 object as they become full. When a data collection buffer becomes full, the Logger 1209 writes the buffer contents to a Journal file 1210 and has the Archiver 1211 object use a Composition 1212 object to pull data items from a data collection buffer. The Archiver 1211 stages data into forms suitable for processing by Information Synthesis 1213 objects and passes them to the Information Synthesis 1213 objects that have been registered for the given DataSchema identifier (e.g., registration of Information Synthesis objects is done with user-configuration files at startup). As with the other Stream Control 1214 objects, Archiver 1211 processing can be controlled with user-defined data filters.

Each of the Stream Control 1214 classes (e.g., Dispatcher 1208, Ingester 1215, and Archiver 1211) can be configured to use any number of Information Synthesis treatments. A class hierarchy is defined to allow an extensible set of treatments that can be applied in various domains of information synthesis. One domain that has been built in for its rich analytic capabilities is Complex Event Processing (CEP). In CEP, an event is something that happens. CEP is a method of tracking and analyzing streams of data about patterns of events to infer more complicated circumstances (e.g., complex events). An instance of a DataSchema is considered an event.

The system employs a rule-based CEP engine allowing a second level of rules for the synthesis of information from data. Specifically, CEP contains a set of user-defined rules (objects of the CepRule 1216 class) in a knowledge base (the CepKB 1217 class). A CepRule 1216 expresses an "if-then" logical production that consists of a condition clause and one-or-more action clauses. The CepRule 1216 grammar includes data access functions that can query and assign individual DataMember 1204 values on data streams submitted by Stream Control objects. A condition clause queries data patterns that accumulate as a system runs and, when a condition evaluates to "true," the actions of the rule are executed. Actions can include setting DataMember 1204 values, asserting new DataSchema 1202 instances, and retracting incoming data.

Other types of information synthesis include an OpenArchive 1218 hierarchy (e.g., the HDF5 open standard and the MATLAB de-facto standard) and a Visualization 1219 hierarchy (e.g., a MATLAB plotting of streamed data).

In computer science and information science, an ontology is a formal representation of what is known about a domain, expressed as a set of concepts and the relationships between those concepts. An ontology defines a common vocabulary for people and systems with the need to share information in a domain, such as the W3C standard Web Ontology Language (OWL). An ontology addresses the problem where the similarities and differences in the meanings of data are masked by inconsistent and imprecisely-defined vocabularies. An ontology-based application depends on and provides the defined meaning of the terms (i.e., the vocabulary, the words) used in the application.

In the context of an ontology, a DataSchema is a formal representation of what data is available from a running system and how elements of the data contribute to an information concept of interest to a user. That is, a DataSchema corresponds with the concept part of an ontology. To the extent that a Metalog contains a set of DataSchema, a Metalog provides a foundation for identifying the concepts of a domain. By adding a capability to model the relationships between DataSchema-as-concepts (the association class Relation 1220), an entire ontology for a domain can be saved in a catalog (Ontolog 1221). The Ontolog 1221 enables a third level of rule processing capability, ontology-mapping rules. With the ontology-mapping rules, not only can disparate vocabularies be reconciled, but moreover, the ontology-mapping patterns can be embodied in the clauses of CepRules 1216 to produce domain-level information synthesis (e.g., above and beyond application-specific data reporting and deduction) within a concurrent, distributed processing infrastructure.

Figure 20:
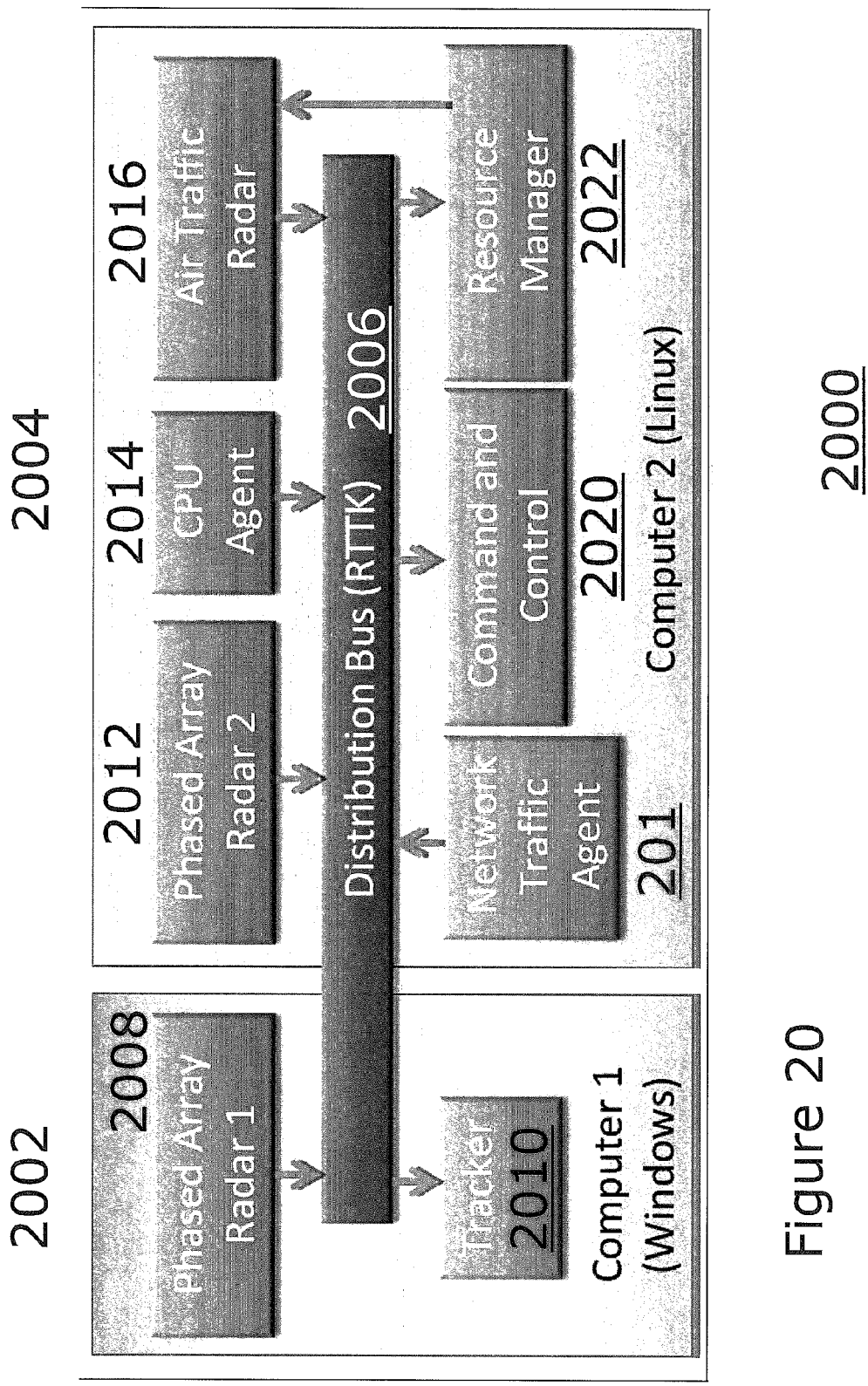
FIG. 20 is a block diagram 2000 illustrating an example embodiment of a radar use case employing the present invention.

FIG. 20 is a block diagram 2000 illustrating an example embodiment of a radar use case employing the present invention. Computer 1 2002, for example a computer running Microsoft Windows®, interfaces with Computer 2 2004, for example a computer running a Linux-based operating system. Data transferring in real time between Windows and Linux machines may require conversions that embodiments of the present invention can optimize. Computer 1 2002 and Computer 2 2004 are coupled via a Distribution Bus (RTTK) 2006.

Computer 1 includes a Phased Array Radar 1 2008 and a Tracker 2010, both of which are coupled to the Distribution Bus 2006. Computer 2 includes a Phased Array Radar 2 2012, a CPU Agent 2014, an Air Traffic Radar 2016, a Network Traffic Agent 2018, a Command and Control 2020, and a Resource Manager 2022, all of which are connected to the Distribution Bus 2006.

Computer 1 2002 and Computer 2 2004 may need to communicate data quickly to track radar objects in real time. Any inefficiencies of converting data between the two computer types can be costly in this regard. Therefore, using the methods described above in embodiments of the present invention, the distribution bus 2006 can speed data conversion between modules of Computer 1 and Computer 2. For example, the tracker 2010 of Computer 1 2002 can receive Phased Array Radar 2 2012 from Computer 2 2004 via the Distribution Bus 2006, and with the improvements of embodiments of the present invention, relay that information to the Tracker 2010 faster. Similarly, information from the Phased Array Radar 1 2008 can be sent to Computer 2 (for example, to the Command and Control module 2020) with similar speed improvements.

A person of ordinary skill in the art can recognize that FIG. 20 illustrates one example use case of embodiments of the present invention. A person of ordinary skill in the art can use embodiments of the present invention for other use cases, including image processing, video processing, video streaming, robotics, or any domain where data is used on multiple machines and may need to be converted.

Figure 21:
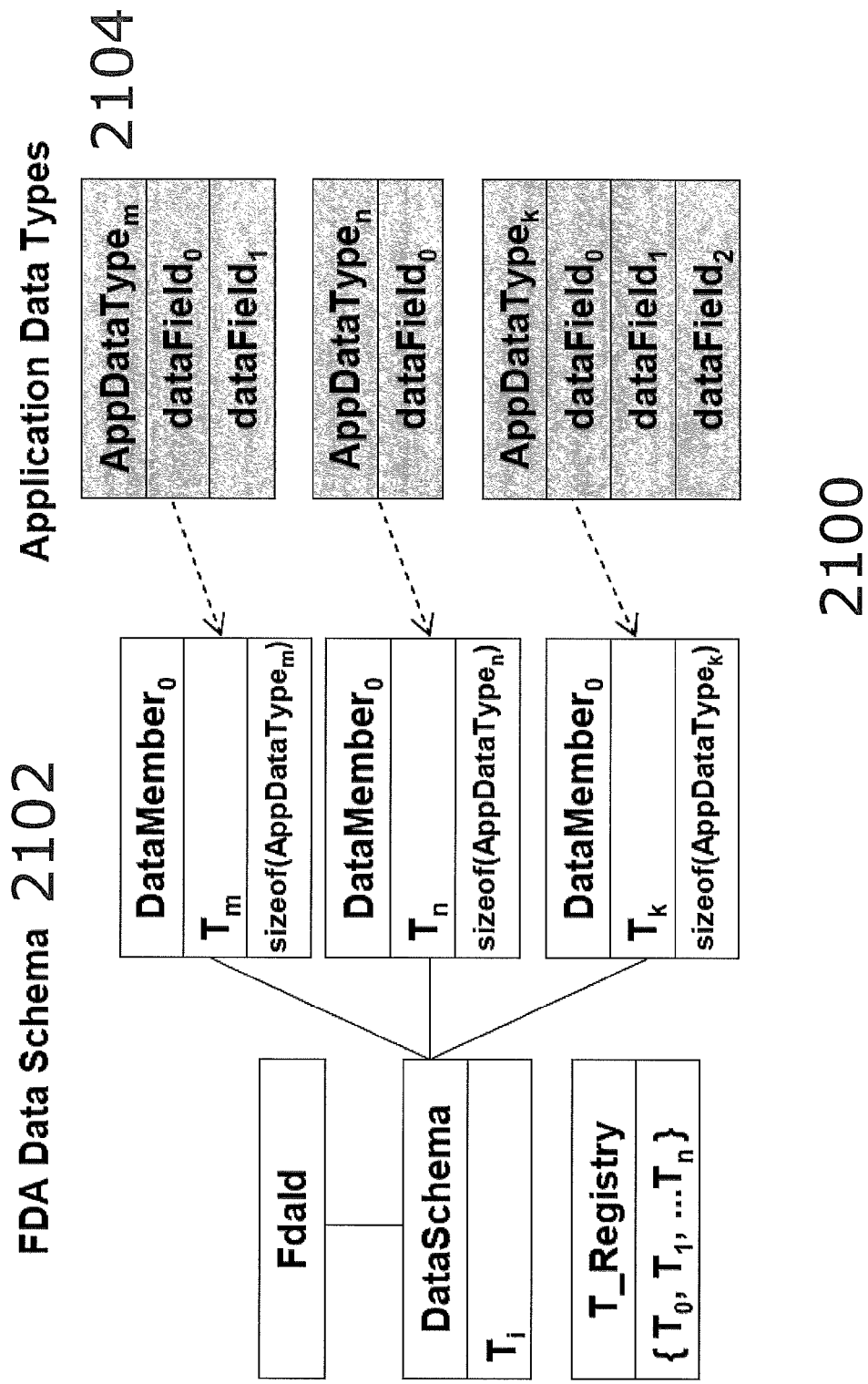
FIG. 21 is a diagram 2100 illustrating an example embodiment of the present invention.

FIG. 21 is a diagram 2100 illustrating an example embodiment of the present invention.

A Metalog can be populated programmatically through an Application Programmer Interface (FDA API), interactively through an FDA Interactive Development Environment (FDA IDE), or automatically though the Metalog Generation Tool (MetGen). In all cases, the definitions of the application classes from which data are to be collected must be available for setting up the Data Member definitions of the FDA Data Schema. For the FDA IDE and the FDA API, it is sufficient to have just the logical specifications of the application data types, although actual source code facilitates the creation of the DataSchema. The MetGen tool accesses the source code. The initial version of MetGen can analyze ADA code.

FIG. 21 illustrates defining an FDA. First, the information needed for system monitoring and control is stored into a set of logical data collection record definitions. Each logical data collection record definition is referred to as a DataSchema in RTTK. Each DataSchema has a defined type, "$T_i$," registered in the Metalog registry. The information in "$T_i$" is used to move dataFields between storage spaces, for example, from an octet sequence into HDF5 files. Each DataSchema is assigned to a unique FDA in the Metalog. For each FDA, the definitions of the application data types (e.g., classes and structs) from which it is to extract data are obtained from their code-based products. Next, for each data member in the Application Data Type 2104 that is to be collected, a semantically equivalent Data Member is added to the Data Schema of the FDA. In the simplest case an entire instance of the application data type is mapped into a Data Member of equivalent type in the FDA. In the general case, a sequence of selected sub-fields of the application data type are mapped to a sequence of equivalent type fields in the FDA.

In other words, the Application Data Types 2104 have respective DataSchemas created in the FDA Data Schema 2102. For example, AppDataType$_m$ corresponds to Datamember$_0$, $T_m$, and sizeof(AppDataType$_m$), AppDataType$_n$ corresponds to Datamember$_0$, $T_n$, and sizeof (AppDataType$_k$), AppDataType$_k$ corresponds to Datamember$_0$, $T_k$, and sizeof(AppDataType$_k$). In this way, a customizable FDA can be programmed for each AppDataType (e.g., each type of class, struct, etc).

Figure 22:
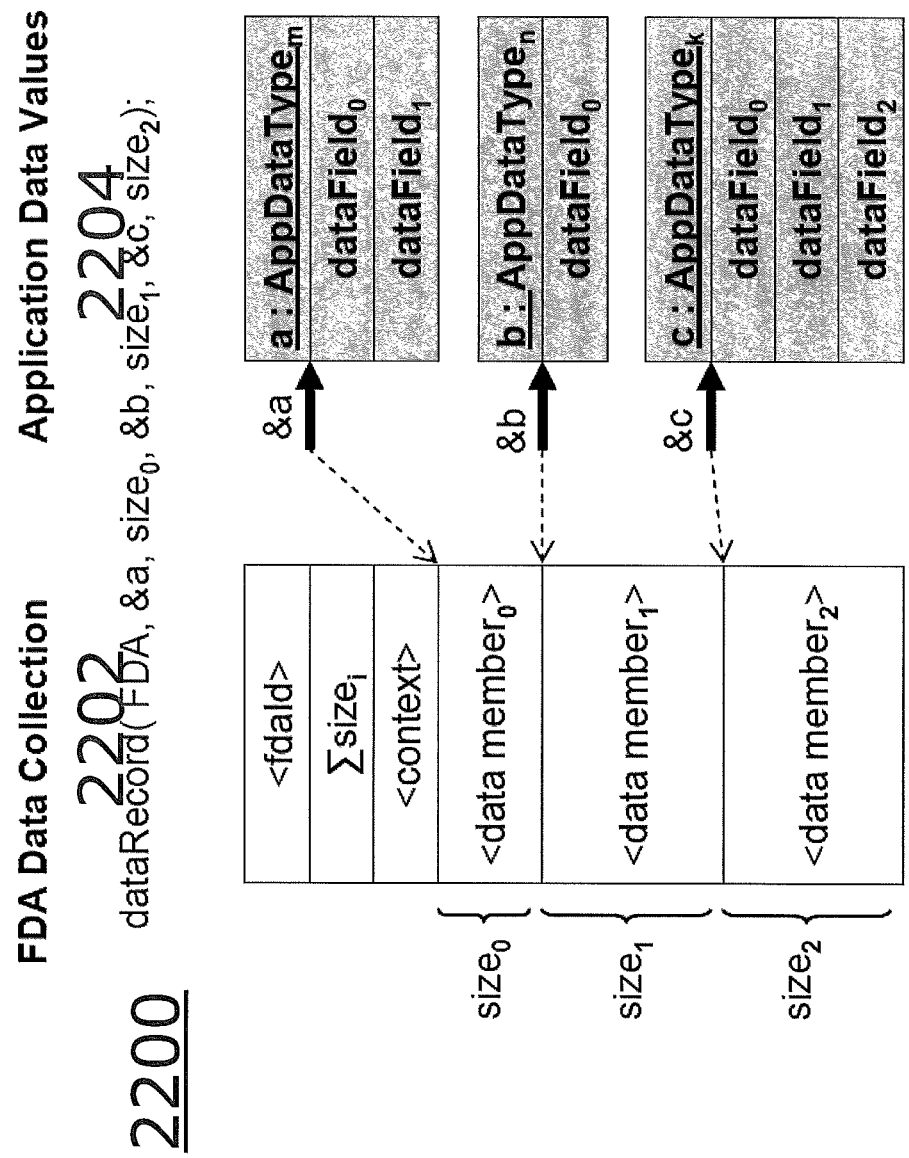
FIG. 22 is a block diagram 2200 illustrating an example embodiment of the present invention.

FIG. 22 is a block diagram 2200 illustrating an example embodiment of the present invention.

In order to collect data from an application, its source code is instrumented with logging calls, referred to herein as "dataRecord" calls. These calls can be placed anywhere in the code where the values from application objects are available. However, if one is instrumenting an application that already has logging calls of its own, the RTTK "dataRecord" call can be inserted within the existing logging method definition alongside the existing data extraction code or instead of it. This allows application developers to use RTTK "dataRecord" to "shadow" an existing data collection mechanism either to verify its performance until a "cutover" decision is made to switch to using RTTK or to "tee" the data to both record to the existing mechanism and to augment the system with additional features available in RTTK that do not exist in the legacy system.

The interface to "dataRecord" is generic and introduces no compilation or link dependencies on the application code base8: "dataRecord(int fdaId, void*src0, int size0, . . . , void*srcN, int sizeN)". When "dataRecord" is called, the memory addresses of values of the application data types are passed in as arguments, "srcX" (e.g., &a, &b, &c). For each application value, the memory size of the value is also passed in, "sizeX" (e.g., $size_1$, $size_2$, and $size_3$). The "dataRecord" function computes the amount of memory needed to record the Header-plus-Payload, based on the data collection configuration settings and the sum of the sizes passed in as arguments. Then it obtains the required storage area as a "chunk" from collection buffer memory, fills in the header part with the FDA value and the execution context information. Then "dataRecord" traverses the list of "srcX/sizeX" pairs, copying bytes from application memory to the collection buffer. This "chunk" is now available for further processing, such as prepublication processing, streaming and archiving.

A person of ordinary skill in the art can recognize that the FDA Data Collection 2102 and 2202 and Application Data Values 2104 and 2204 relationships illustrated in FIGS. 21 and 22 are one example embodiment of converting data between systems. However, embodiments of the present invention can employ other formats and data orderings, for example, in the mapping of data schema to native data.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for transferring data from a source platform to one or more target platforms, comprising:
    from a source platform and a native binary data stored in memory on the source platform, determining schema for an application native to the source platform based on at least one of: software code, files related to the application, a compiler, and platform information that characterizes data layout and computational interpretation of the native binary data on the source platform, wherein the platform information includes encoding policy settings;
    communicatively coupling the source platform to the one or more target platforms enabling the one or more target platforms to access a message including the determined schema and platform information of the source platform;
    converting the determined schema to a form useable by the one or more target platforms, the converted schema enabling the one or more target platforms to synthesize meaning from the native binary data of the source platform without converting the native binary data; and
    on each target platform, before converting the native binary data, utilizing the converted schema and platform information to synthesize meaning from the native binary data by identifying data fields within the native binary data from the source platform, selecting one or more of the identified data fields, and converting data of the one or more selected data fields to a data format useable by operations on the target platform.

2. The method of claim 1, wherein the source platform is the target platform.

3. The method of claim 1, wherein the source platform and the one or more target platforms are heterogeneous.

4. The method of claim 1, further comprising, distinguishing, using the encoded policy settings, data encodings in native binary form on the source platform from data encodings in native binary form on the one or more target platforms.

5. The method of claim 1, further including utilizing the the identified data fields for operations on the one or more target platforms.

6. The method of claim 1, wherein the schema is metadata created by: (a) accounting for structure, terminology, layout, and semantics of native binary data on the source platform and formulating a metadata representation, and (b) maintaining the formulated metadata representation in a sharable and distributable form.

7. The method of claim 1, wherein the source platform and the one or more target platforms are capable of being operated concurrently both among the target platforms and with the source platform.

8. The method of claim 1 wherein converting the determined schema further includes:
    based on the encoded policy settings, mapping a structural form of the native binary data on the source platform to an operational form in the target platform; and
    applying said mapping from the native binary data structural form on the source platform to the operational form in the target platform.

9. The method of claim 1 further comprising:
    devising ontology representations that infer meaning from patterns of plural schemas and established ontologies;
    recognizing patterns of data in the determined ontology representations that match the established ontologies; and
    synthesizing information based on matched ontologies.

10. The method of claim 9 wherein devising ontology representations includes:
    identifying schemas and ontologies associated with the established ontology;
    mapping data fields of the identified schemas and ontologies; and
    for each data field mapping, defining an expression that transforms a value of the data field in data of the source platform into one or more data field values on the target platform.

11. The method of claim 9 wherein the determined ontology representations are maintained in a shareable and distributable form.

12. A system for ontology-based concurrent information synthesis, comprising:
    a) a source platform which includes:
        i) a native binary data stored in memory; and
        ii) a module for determining schema for an application native to the source platform based on at least one of: software code, files related to the application, a compiler, and platform information that characterize data layout and computational interpretation of the native binary data on the source platform, wherein the platform information includes encoding policy settings;

b) one or more target platforms;

c) a network configured to communicatively coupling the source platform to the one or more target platforms, enabling the one or more target platforms to access a message including the determined schema and platform information of the source platform;

d) a module for converting the determined schema to a form useable by the one or more target platforms, the converted schema enabling the one or more target platforms to synthesize meaning from the native binary data of the source platform without converting the native binary data;

e) on each target platform, a module for synthesizing meaning from native binary data configured to: (1) utilize the converted schema and platform information, before converting the native binary data, to synthesize meaning from the native binary data by identifying data fields within the native binary data from the source platform, (2) select one or more of the identified data fields, and (3) convert data of the one or more selected data fields to a data format useable by operations on the target platform.

13. The system of claim 12 wherein the source platform is the target platform.

14. The system of claim 12 wherein the source platform and the one or more target platforms are heterogeneous.

15. The system of claim 12 wherein the encoding policy settings distinguish how data is encoded in native binary form on the source platform from how that data is encoded in native binary form on the one or more target platforms.

16. The system of claim 12 wherein the module for synthesizing meaning from native binary data is further configured to enable operations on the target platform to access the identified data fields.

17. The system of claim 12 wherein the schema is metadata created by a metadata generation module that accounts for structure, terminology, layout, and semantics of native binary data on the source platform, formulates a metadata representation, and maintains the formulated metadata representation in a sharable and distributable form.

18. The system of claim 12 wherein the source platform and the one or more target platforms are operated concurrently both among the target platforms and with the source platform.

19. The system of claim 12 wherein the module for extracting establishes a mapping from structural form of the native binary data on the source platform to an operational form in the target platform, based on the encoding policy settings, and applies said mapping from the native binary data structural form on the source platform to the operational form in the target platform.

20. The system of claim 12 further comprising: a module for devising ontology representations, wherein the module for devising ontology representations infers meaning from patterns of plural schemas and established ontologies, recognizes patterns of data based on the devised ontology representations that match established ontologies, synthesizes information based on matched ontologies.

21. The system of claim 20 wherein the module for devising ontology representations additionally identifies schemas and ontologies associated with the established ontologies, maps data fields of the identified and ontologies, and for each data field mapping, defines an expression that transforms a value of the data field in data of the source platform into one or more data field values on the target platform.

22. The method of claim 20 wherein the devised ontology representations are maintained in a shareable and distributable form.

* * * * *